United States Patent
Shin et al.

(10) Patent No.: US 10,784,792 B2
(45) Date of Patent: Sep. 22, 2020

(54) POWER CONVERSION DEVICE

(71) Applicant: NISSAN MOTOR CO., LTD., Yokohama-shi, Kanagawa (JP)

(72) Inventors: Kentaro Shin, Kanagawa (JP); Shigeharu Yamagami, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/305,212

(22) PCT Filed: Jun. 2, 2016

(86) PCT No.: PCT/JP2016/066396
§ 371 (c)(1),
(2) Date: Nov. 28, 2018

(87) PCT Pub. No.: WO2017/208418
PCT Pub. Date: Dec. 7, 2017

(65) Prior Publication Data
US 2019/0341857 A1    Nov. 7, 2019

(51) Int. Cl.
*H02M 5/458* (2006.01)
*H02M 1/14* (2006.01)
*H02M 7/48* (2007.01)

(52) U.S. Cl.
CPC ........... *H02M 5/458* (2013.01); *H02M 1/143* (2013.01); *H02M 7/48* (2013.01)

(58) Field of Classification Search
CPC .................................. H02M 7/003; H02M 7/48

USPC ................................. 363/140, 144, 146, 147
See application file for complete search history.

(56) References Cited

U.S. PATENT DOCUMENTS

| | | | |
|---|---|---|---|
| 9,755,544 B2 | 9/2017 | Shin et al. | |
| 2005/0174820 A1 | 8/2005 | Mutoh | |
| 2013/0221895 A1 | 8/2013 | Kanda et al. | |
| 2014/0233282 A1* | 8/2014 | Ohoka | H02M 1/14 363/39 |
| 2014/0286070 A1 | 9/2014 | Shin et al. | |
| 2014/0321171 A1 | 10/2014 | Fujita et al. | |
| 2019/0312522 A1* | 10/2019 | Li | H02M 7/003 |

FOREIGN PATENT DOCUMENTS

| | | |
|---|---|---|
| CN | 103368376 A | 10/2013 |
| CN | 103975517 A | 8/2014 |
| EP | 2 752 982 A1 | 7/2014 |
| EP | 2 787 627 A1 | 10/2014 |
| JP | 2005-117862 A | 4/2005 |
| JP | 2006-238582 A | 9/2006 |
| JP | 2010-233294 A | 10/2010 |
| JP | 2016-007093 A | 1/2016 |
| JP | 2016-29872 A | 3/2016 |

* cited by examiner

*Primary Examiner* — Nguyen Tran
(74) *Attorney, Agent, or Firm* — Foley & Lardner LLP

(57) ABSTRACT

A power conversion device that converts power supplied via a first power feed bus and a second power feed bus, and includes: an inductance element connected to the first power feed bus; and a power module that converts power supplied between the first power feed bus and the second power feed bus by switching. The power conversion device further includes: a housing that houses the inductance element and the power module therein; and a first impedance element provided between the inductance element and the housing.

15 Claims, 20 Drawing Sheets

POWER CONVERSION DEVICE

TECHNICAL FIELD

The present invention relates to a power conversion device that converts power output from an alternating-current power supply or a direct-current power supply to desired direct-current power.

BACKGROUND ART

Conventionally, a power conversion device is used for charging a low-voltage battery from a high-voltage battery, in an electric car, a hybrid vehicle, or the like. A switch is mounted inside the power conversion device, which is formed by a power semiconductor element of a discrete package or a modularized power semiconductor element (hereinafter, "power module"). The power module switches on/off of the switch by a signal provided from a control circuit to convert a voltage.

When a switching element is switched on and off, switching noise is generated in the power module and propagates to the power-supply side and the load side. Therefore, in a case where power is supplied from a commercial power supply installed in a standard home to a power conversion device mounted on a vehicle, for example, noise may propagate to an electric system on the home side.

Patent Literature 1 discloses suppressing of noise by grounding a frame of a reactor provided in a power module via an impedance element in order to remove noise.

CITATION LIST

Patent Literature

Patent Literature 1: Japanese Patent Laid-Open Publication No. 2006-238582

SUMMARY OF INVENTION

However, the conventional example disclosed in Patent Literature 1 does not adjust an impedance between an inductance element and the frame, and does not reduce noise effectively.

The present invention has been made in view of such conventional problems. It is an object of the present invention to provide a power conversion device that can reduce noise generated when a switching element is switched on and off.

A power conversion device according to an aspect of the present invention includes an inductance element connected to a first power feed bus, a switching element that converts power supplied between the first power feed bus and a second power feed bus by switching, a housing that houses the inductance element and the switching element, and a first impedance element provided between the inductance element and the housing.

Advantageous Effects of Invention

According to an aspect of the present invention, it is possible to reduce noise generated when a switching element is switched on and off.

DESCRIPTION OF EMBODIMENTS

Embodiments of the present invention are described below with reference to the accompanying drawings.

Descriptions of First Embodiment

Figure 1:
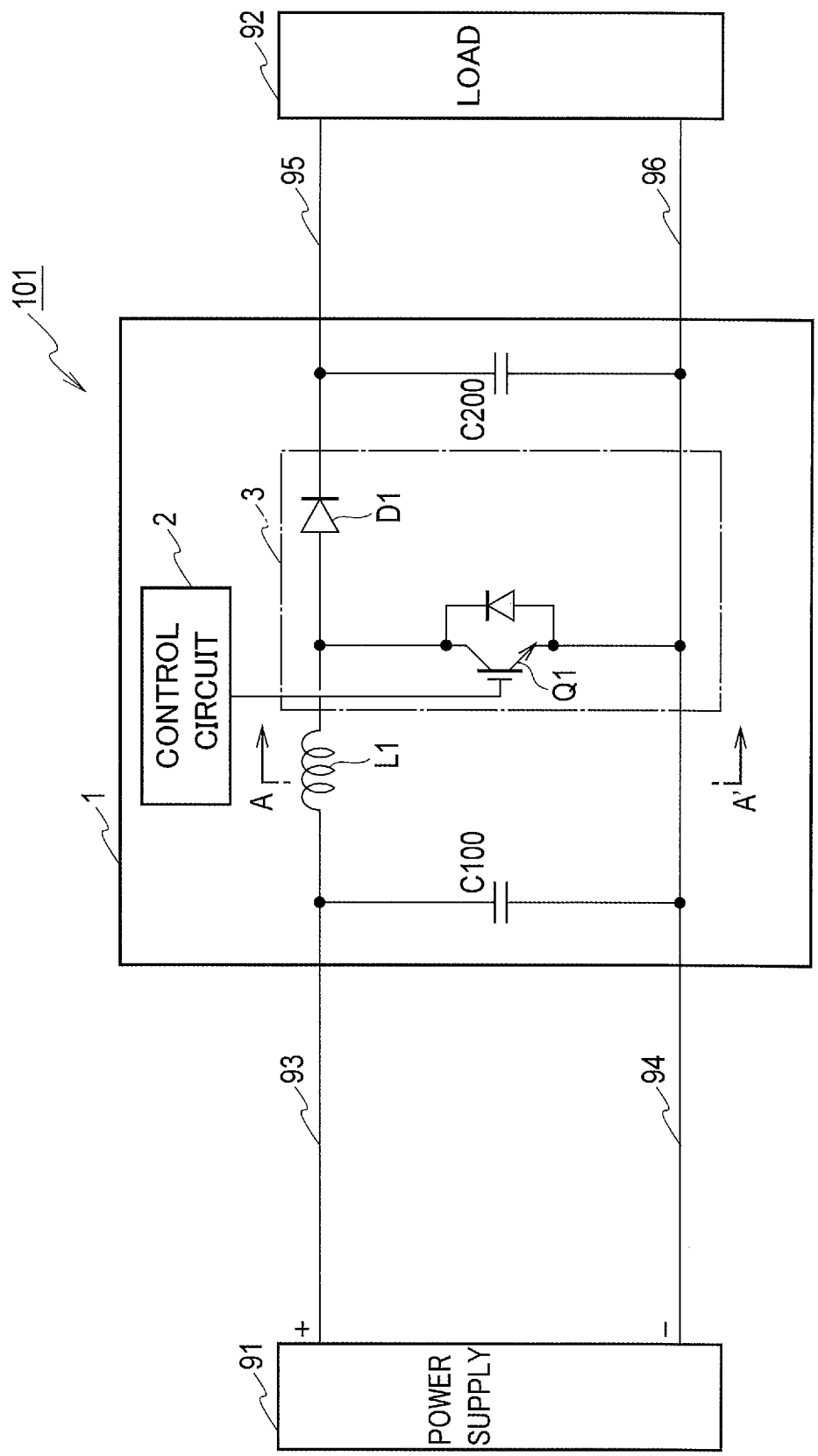
FIG. 1 is a circuit diagram illustrating a configuration of a power conversion device and peripheral devices thereof according to an embodiment of the present invention.

FIG. 1 is a circuit diagram illustrating a configuration of a power conversion device and peripheral devices thereof according to a first embodiment of the present invention. As illustrated in FIG. 1, a power conversion device 101 according to the present embodiment is entirely covered by a housing 1 made of metal, such as iron or aluminum. The input side of the power conversion device 101 is connected to a power supply 91 that outputs a direct current via a first power feed bus 93 and a second power feed bus 94, and the output side thereof is connected to a load 92 via output lines 95 and 96. Therefore, it is possible to convert a voltage supplied from the power supply 91 into a desired voltage and supply the converted voltage to the load 92. The power supply 91 is a commercial power supply or a battery installed in a standard home, for example. The load 92 is a battery mounted on an electric car or a hybrid vehicle, for example.

A positive terminal of the power supply 91 is connected to the first power feed bus 93, and a negative terminal thereof is connected to the second power feed bus 94.

An inductance element L1 connected to the first power feed bus 93 is provided in the housing 1 of the power conversion device 101. Further, a power module 3 is provided between the first power feed bus 93 and the second power feed bus 94.

The power module 3 includes a switching element Q1 such as an IGBT (insulated gate bipolar transistor) or a MOSFET, and a diode D1. The inductance element L1 is, for example, a toroidal winding coil or a flat coil.

Smoothing capacitors C100 and C200 are provided at a preceding stage and a subsequent stage of the power module 3, respectively. A control input of the switching element Q1 (for example, a base of an IGBT) is connected to a control circuit 2 that controls on/off of the switching element Q1.

By controlling on/off of the switching element Q1 under control by the control circuit 2, a voltage supplied from the power supply 91 is converted to a different voltage to be supplied to the load 92.

Figure 2:
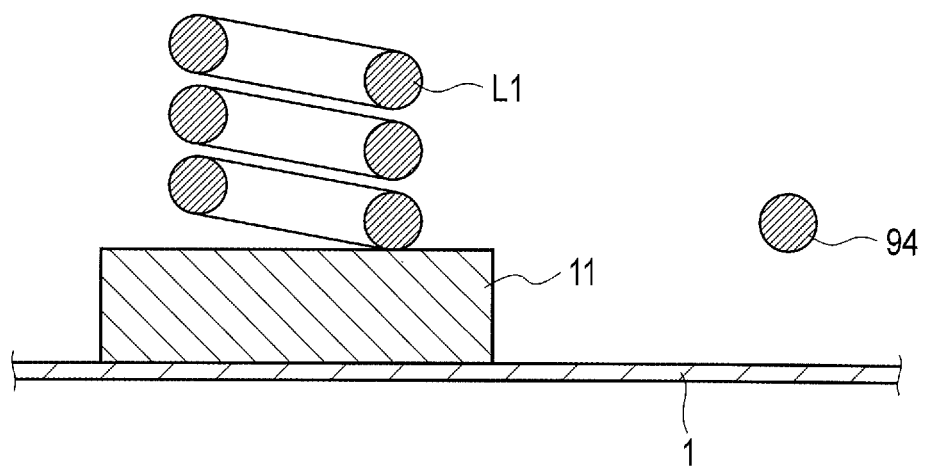
FIG. 2 is an explanatory diagram illustrating a cross-section of an inductance element and a second power feed bus of the power conversion device according to a first embodiment.

FIG. 2 illustrates an "A-A'" cross-section illustrated in FIG. 1. As illustrated in FIG. 2, a first impedance element 11 is provided between the inductance element L1 and the housing 1. For example, the first impedance element 11 is a capacitance element or a series-connected circuit formed by a capacitance element and a resistance element.

In the power conversion device 101 according to the first embodiment, by providing the first impedance element 11, an impedance between the inductance element L1 and the housing 1 is made closer to a second stray capacitance that exists between the second power feed bus 94 and the housing 1. In this manner, noise propagating from the inductance element L1 to the housing 1 is suppressed, when power is supplied to the load 92 illustrated in FIG. 1 to drive the load 92. To "make closer" is a concept including complete match.

Figure 3:
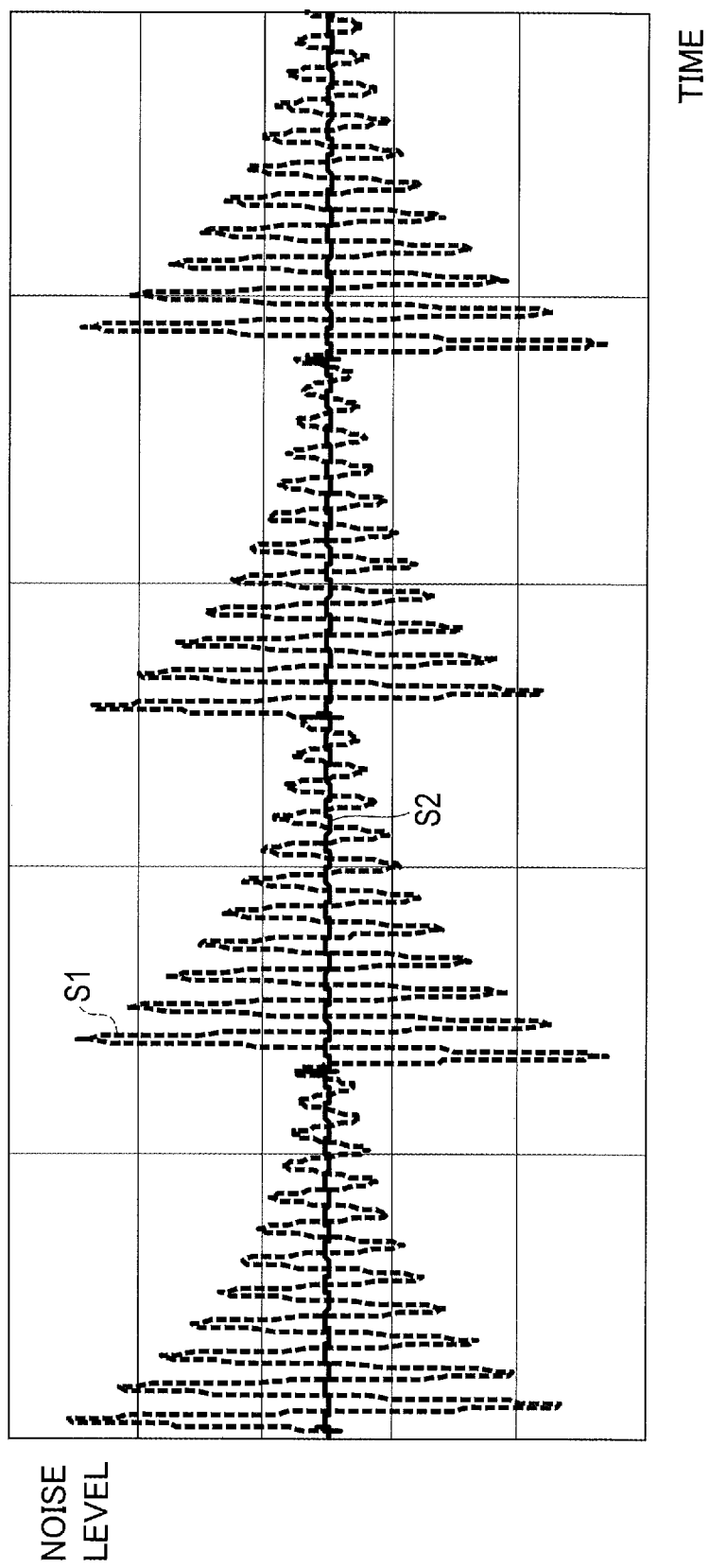
FIG. 3 is a graph representing the level of noise generated in a power conversion device.

FIG. 3 is a graph representing noise that propagates to the housing 1 when the switching element Q1 is switched. In FIG. 3, a curve S1 illustrated with a dotted line represents a change of noise in a case where the first impedance element 11 is not provided, and a curve S2 illustrated with a solid line represents a change of noise in a case where the first impedance element 11 is provided. As is understood from the graph of FIG. 3, noise propagating from the inductance element L1 to the housing 1 is reduced by providing the first impedance element 11.

In this manner, in the power conversion device according to the first embodiment, an impedance between the inductance element L1 and the housing 1 can be made higher to become closer to a second stray capacitance existing between the second power feed bus 94 and the housing 1 by providing the first impedance element 11. Therefore, noise propagating from the inductance element L1 to the housing 1 can be reduced.

Descriptions of Modification of First Embodiment

Figure 4:
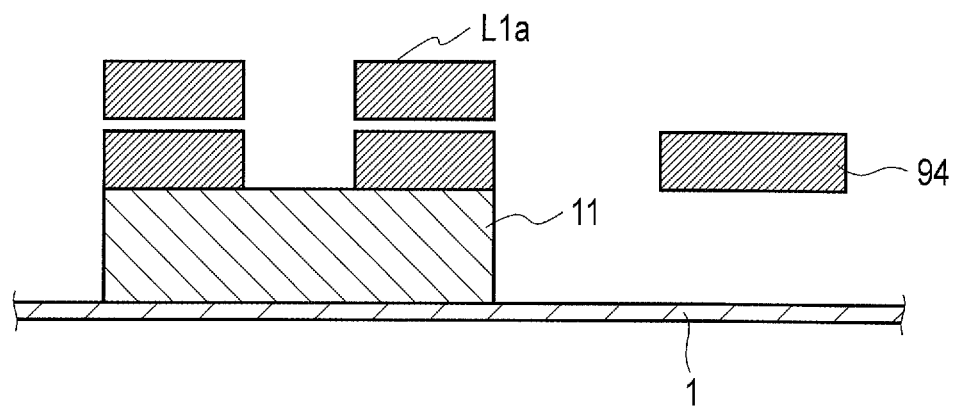
FIG. 4 is an explanatory diagram illustrating a cross-section of an inductance element and a second power feed bus of a power conversion device according to a modification of the first embodiment.

Next, a modification of the first embodiment is described. A power conversion device according to the modification is different in that it uses a planer inductance element L1a and the second power feed bus 94 is formed as a flat wire or a substrate pattern. FIG. 4 is a cross-sectional view of the inductance element L1a and the second power feed bus 94. As illustrated in FIG. 4, the inductance element L1a and the second power feed bus 94 both have a flat shape. Further, the first impedance element 11 is provided between the inductance element L1a and the housing 1. The planar inductance element L1a can be formed by a substrate pattern.

Also with this configuration, it is possible to reduce noise that propagates from the inductance element L1a to the housing 1, similarly to the first embodiment described above. Although each of the following embodiments will describe an example in which a toroidal coil is used as the inductance element L1, as illustrated in FIG. 2, a planar inductance element L1a illustrated in FIG. 4 can be used.

Descriptions of Second Embodiment

Figure 5:
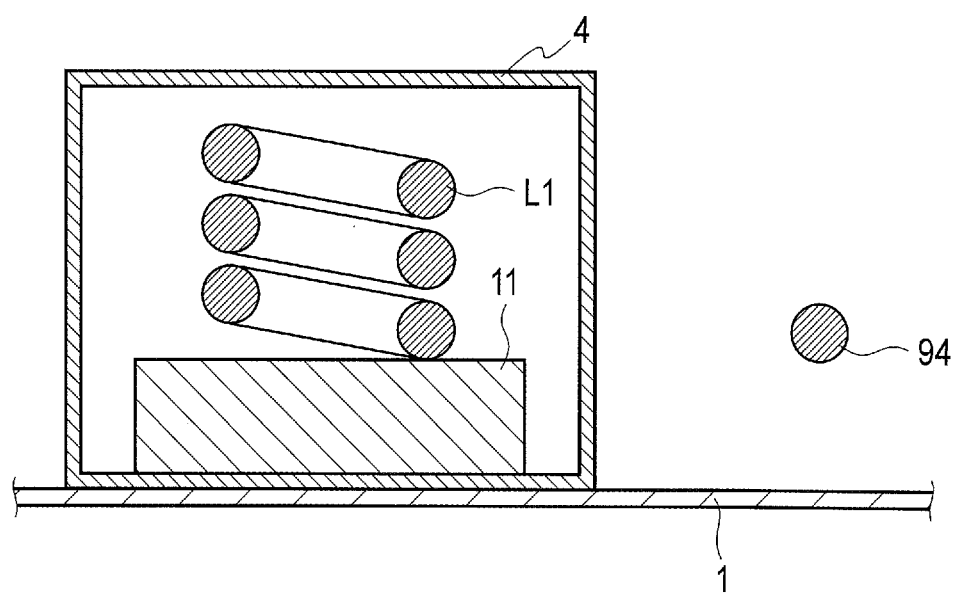
FIG. 5 is an explanatory diagram illustrating a cross-section of an inductance element and a second power feed bus of a power conversion device according to a second embodiment.

Next, a second embodiment of the present invention is described. FIG. 5 is an explanatory diagram illustrating a cross-section of the inductance element L1 and the second power feed bus 94 of a power conversion device according to the second embodiment. As illustrated in FIG. 5, the inductance element L1 is housed in a frame 4 made of metal, such as iron or aluminum. The frame 4 is fixed to the housing 1 and is in electrical conduction with the housing 1. The first impedance element 11 is provided between the inductance element L1 and the frame 4. That is, the second embodiment is different from the first embodiment described above in that the inductance element L1 is housed in the frame 4. Because the frame 4 is provided within the housing 1 and the first impedance element 11 is provided between the inductance element L1 and the frame 4, the first impedance element 11 is provided between the inductance element L1 and the housing 1.

As described above, the inductance element L1 is housed in the frame 4 in the power conversion device according to the second embodiment. Therefore, noise directly radiated from the inductance element L1 can be suppressed. Further, by providing the first impedance element 11, it is possible to increase an impedance between the inductance element L1 and the frame 4, so that an impedance between the inductance element L1 and the housing 1 can be made closer to a second stray capacitance between the second power feed bus 94 and the housing 1. As a result, noise propagating from the inductance element L1 to the housing 1 can be reduced.

Descriptions of Modification of Second Embodiment

Figure 6:
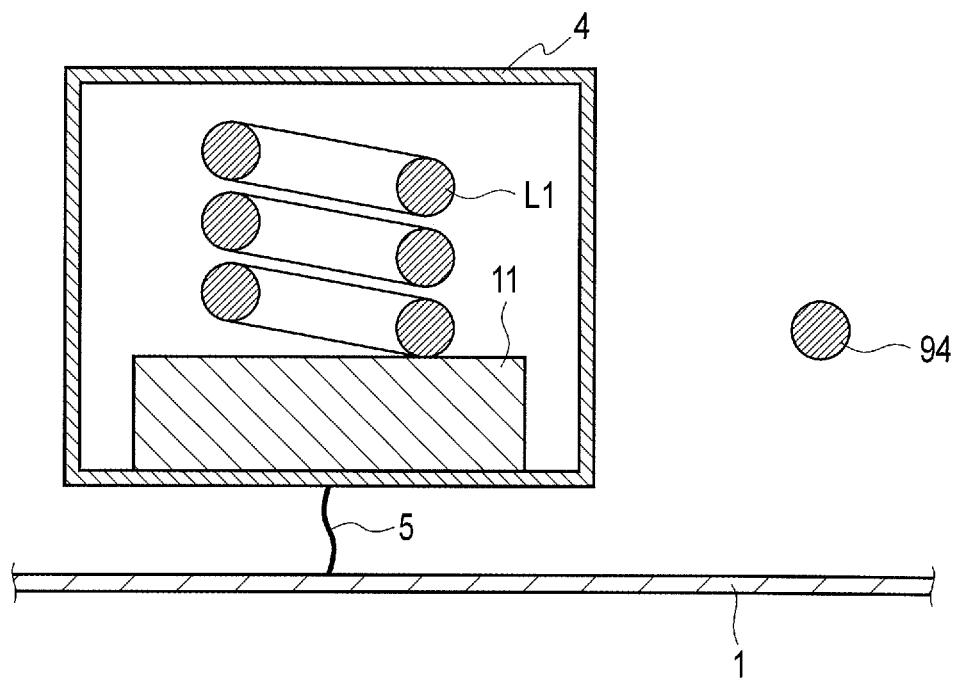
FIG. 6 is an explanatory diagram illustrating a cross-section of an inductance element and a second power feed bus of a power conversion device according to a modification of the second embodiment.

Next, a modification of the second embodiment is described. FIG. 6 is an explanatory diagram illustrating a cross-section of the inductance element L1 and the second power feed bus 94 of a power conversion device according to the modification of the second embodiment.

As illustrated in FIG. 6, the modification is different from the second embodiment described above in that a bottom surface of the frame 4 that houses the inductance element L1 therein and the housing 1 are connected to each other by a wire 5. That is, the housing 1 and the frame 4 are in conduction with each other by the wire 5. The housing 1 and the frame 4 are fixed by an insulating body or the like (not illustrated). Even with this configuration, effects identical to those of the second embodiment described above can be achieved.

Descriptions of Third Embodiment

Figure 7:
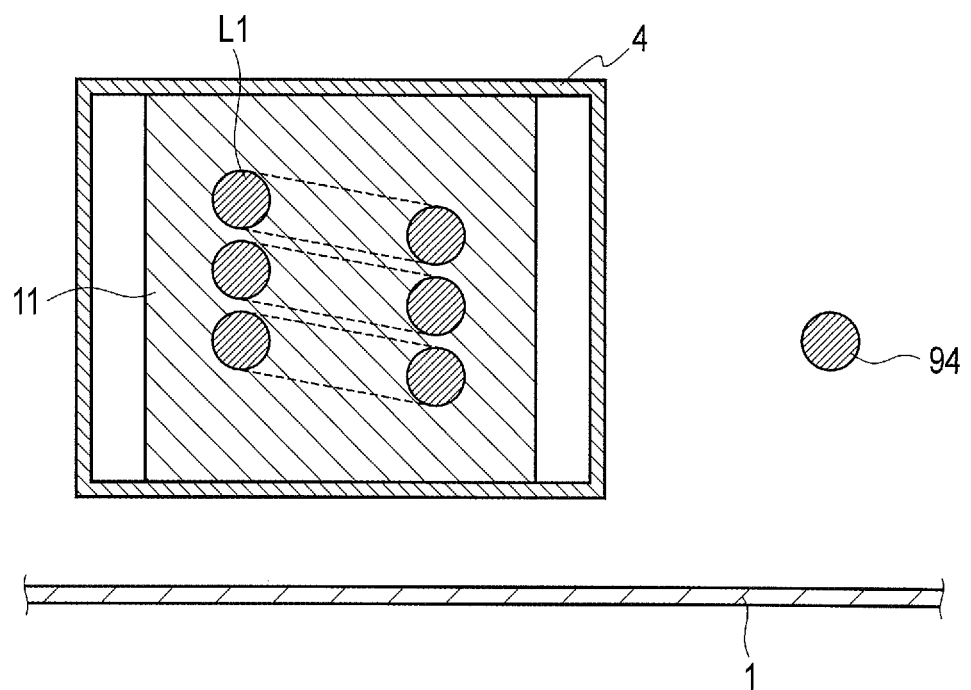
FIG. 7 is an explanatory diagram illustrating a cross-section of an inductance element and a second power feed bus of a power conversion device according to a third embodiment.

Next, a third embodiment of the present invention is described. FIG. 7 is an explanatory diagram illustrating a cross-section of the inductance element L1 and the second power feed bus 94 of a power conversion device according to the third embodiment. As illustrated in FIG. 7, in the power conversion device according to the third embodiment, the inductance element L1 is housed in the frame 4. Further, the first impedance element 11 is provided to cover the inductance element L1. The first impedance element 11 is a dielectric body, for example.

The frame 4 is provided in the housing 1, and the first impedance element 11 is provided between the inductance element L1 and the frame 4. Further, because the frame 4 and the housing 1 are coupled to each other by a stray capacitance, the first impedance element 11 is provided between the inductance element L1 and the housing 1.

Further, the housing 1 and the frame 4 are fixed by an insulating body or the like (not illustrated). Because a stray capacitance exists between the frame 4 and the housing 1, a predetermined electrostatic capacitance exists between the inductance element L1 and the housing 1.

In this manner, in the power conversion device according to the third embodiment, noise propagating from the inductance element L1 to the housing 1 can be reduced by making a predetermined electrostatic capacitance described above closer to a second stray capacitance between the second power feed bus 94 and the housing 1.

Descriptions of Fourth Embodiment

Figure 8:
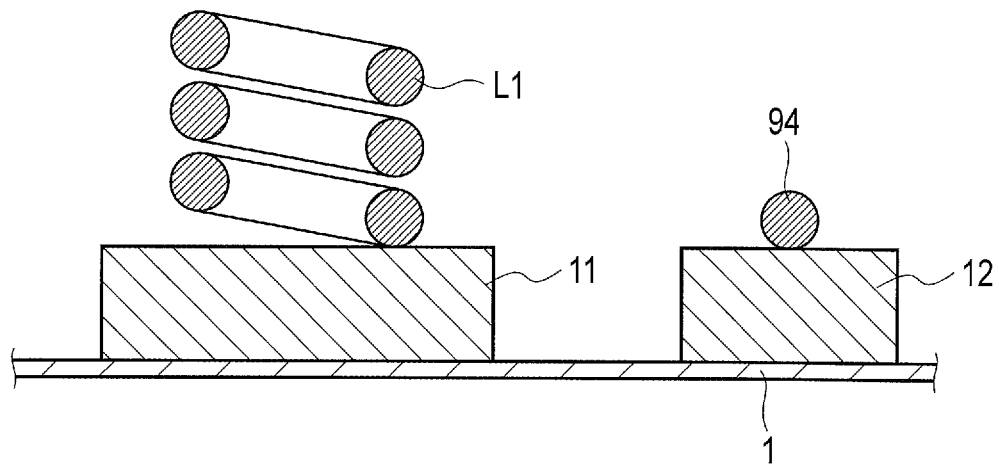
FIG. 8 is an explanatory diagram illustrating a cross-section of an inductance element and a second power feed bus of a power conversion device according to a fourth embodiment.

Next, a fourth embodiment of the present invention is described. FIG. 8 is an explanatory diagram illustrating a cross-section of the inductance element L1 and the second power feed bus 94 of a power conversion device according to the fourth embodiment. As illustrated in FIG. 8, in the power conversion device according to the fourth embodiment, the first impedance element 11 is provided between the inductance element L1 and the housing 1. Further, a second impedance element 12 is provided between the second power feed bus 94 and the housing 1.

By providing the first impedance element 11 and the second impedance element 12, it is possible to make an impedance between the inductance element L1 and the housing 1 and an impedance between the second power feed bus 94 and the housing 1 closer to each other. Therefore, it is possible to reduce noise propagating from the inductance element L1 to the housing 1 and noise propagating from the second power feed bus 94 to the housing 1.

Further, because the first impedance element 11 and the second impedance element 12 are provided, fine adjustment of each impedance can be performed. Therefore, it is possible to match an impedance between the inductance element L1 and the housing 1 and an impedance between the second power feed bus 94 and the housing 1 more easily. Therefore, it is possible to reduce noise propagating from the inductance element L1 to the housing 1 and noise propagating from the second power feed bus 94 to the housing 1 with a simple operation.

Descriptions of Fifth Embodiment

Figure 9:
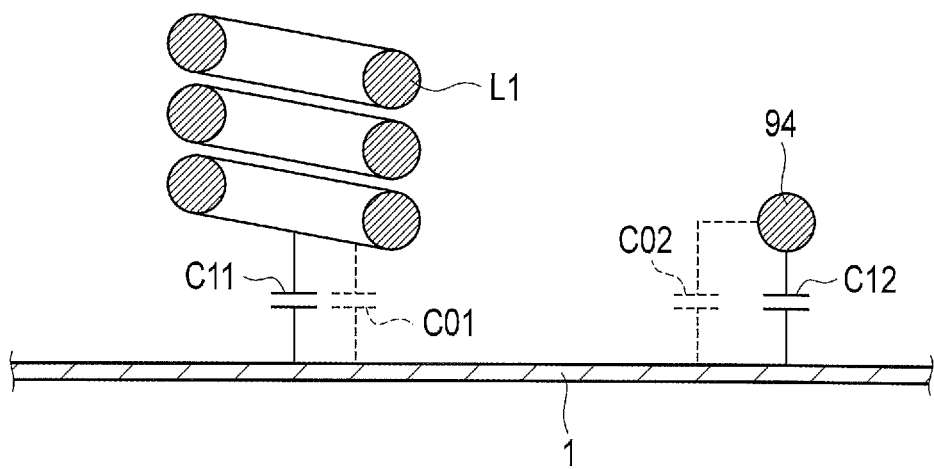
FIG. 9 is an explanatory diagram illustrating a cross-section of an inductance element and a second power feed bus of a power conversion device according to a fifth embodiment.

Next, a fifth embodiment of the present invention is described. FIG. 9 is an explanatory diagram illustrating a cross-section of the inductance element L1 and the second power feed bus 94 of a power conversion device according to the fifth embodiment. As illustrated in FIG. 9, in the fifth embodiment, a first capacitance element C11 is provided between the inductance element L1 and the housing 1.

Further, a second capacitance element C12 is provided between the second power feed bus 94 and the housing 1. That is, in the fifth embodiment, the first impedance element 11 illustrated in FIG. 8 is replaced with the first capacitance element C11 and the second impedance element 12 is replaced with the second capacitance element C12. Further, C01 in FIG. 9 denotes a first stray capacitance between the inductance element L1 and the housing 1, and C02 denotes a second stray capacitance between the second power feed bus 94 and the housing 1.

In the fifth embodiment, an electrostatic capacitance that is a total of the first stray capacitance C01 and an electrostatic capacitance of the first capacitance element C11 and an electrostatic capacitance that is a total of the second stray capacitance C02 and an electrostatic capacitance of the second capacitance element C12 are made closer to each other by appropriately setting the electrostatic capacitances of the first capacitance element C11 and the second capacitance element C12. As a result, it is possible to match a voltage applied between the inductance element L1 and the housing 1 with a voltage applied between the second power feed bus 94 and the housing 1, so that noise propagating from the inductance element L1 and the second power feed bus 94 to the housing 1 can be reduced.

Figure 10:
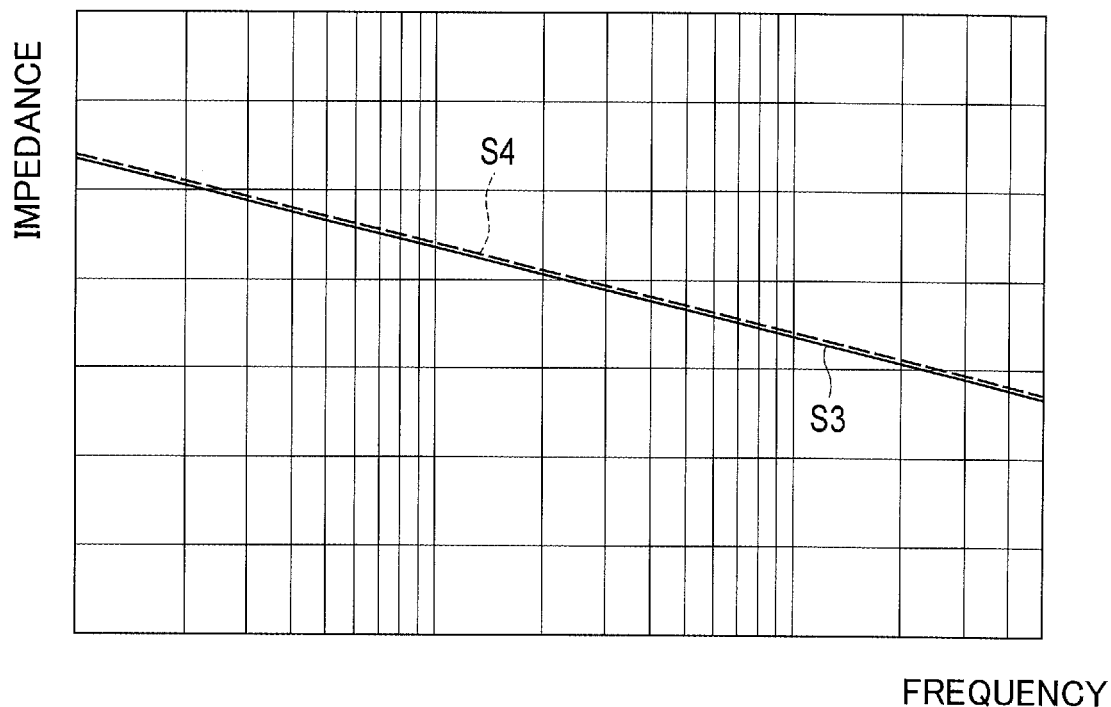
FIG. 10 is a graph representing a relation between a frequency and an impedance of the power conversion device according to the fifth embodiment.

FIG. 10 is a graph representing a relation between a frequency and an impedance. In FIG. 10, a curve S3 illustrated with a solid line represents a change of impedance between the inductance element L1 and the housing 1 with respect to a change of frequency. A curve S4 illustrated with a dotted line represents a change of impedance between the second power feed bus 94 and the housing 1 with respect to a change of frequency. As is understood from the curves S3 and S4, the impedances respectively represented by the curves S3 and S4 are substantially matched with each other irrespective of the frequencies thereof. That is, in the power conversion device according to the fifth embodiment, noise propagating to a housing can be reduced even in a case where a frequency of the switching element Q1 is changed.

Descriptions of Sixth Embodiment

Figure 11:
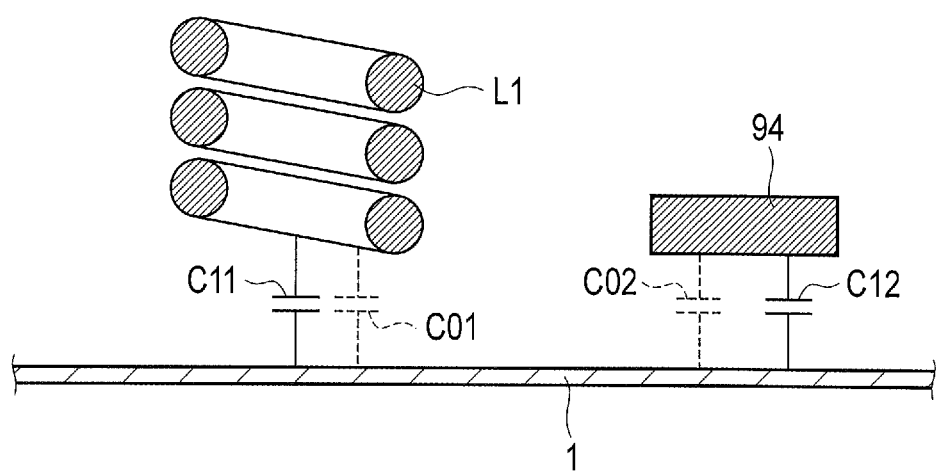
FIG. 11 is an explanatory diagram illustrating a cross-section of an inductance element and a second power feed bus of a power conversion device according to a sixth embodiment.

Next, a sixth embodiment of the present invention is described. FIG. 11 is an explanatory diagram illustrating a cross-section of the inductance element L1 and the second power feed bus 94 of a power conversion device according to the sixth embodiment. As illustrated in FIG. 11, in the sixth embodiment, the first capacitance element C11 is provided between the inductance element L1 and the housing 1, similarly to the fifth embodiment illustrated in FIG. 9. Further, the second capacitance element C12 is provided between the second power feed bus 94 and the housing 1. Further, the first stray capacitance C01 exists between the inductance element L1 and the housing 1, and the second stray capacitance C02 exists between the second power feed bus 94 and the housing 1. The sixth embodiment is different from the fifth embodiment in that the second power feed bus 94 is formed by a flat wire.

In the power conversion device according to the sixth embodiment, an electrostatic capacitance that is a total of the first stray capacitance C01 and an electrostatic capacitance of the first capacitance element C11 and an electrostatic capacitance that is a total of the second stray capacitance C02 and an electrostatic capacitance of the second capacitance element C12 can be made closer to each other by appropriately setting the electrostatic capacitances of the first capacitance element C11 and the second capacitance element C12, similarly to the fifth embodiment described above. Use of a flat wire as the second power feed bus 94 enables adjustment of the second stray capacitance C02. This point is described in detail below.

An electrostatic capacitance between the second power feed bus 94 and the housing 1 (the second stray capacitance C02) can be expressed by the following expression (1).

$$(\text{Electrostatic capacitance}) = \varepsilon_0 \cdot \varepsilon_r \cdot (S/d) \quad (1)$$

where $\varepsilon_0$ is a permittivity of vacuum, $\varepsilon_r$ is a relative permittivity, S is an opposed area, and d is a distance.

Therefore, by changing the opposed area S, it is possible to change the second stray capacitance C02 between the second power feed bus 94 and the housing 1. In the sixth embodiment, an electrostatic capacitance between the inductance element L1 and the housing 1 and the electrostatic capacitance between the second power feed bus 94 and the housing 1 are set by adjusting the opposed area S between the second power feed bus 94 and the housing 1 in addition to the first capacitance element C11 and the second capacitance element C12. Therefore, adjustment of electrostatic capacitances can be easily performed. Accordingly, it is possible to make a voltage applied between the inductance element L1 and the housing 1 and a voltage applied between the second power feed bus 94 and the housing 1 closer to each other, so that noise propagating to the housing 1 can be reduced.

Descriptions of Seventh Embodiment

Figure 12:
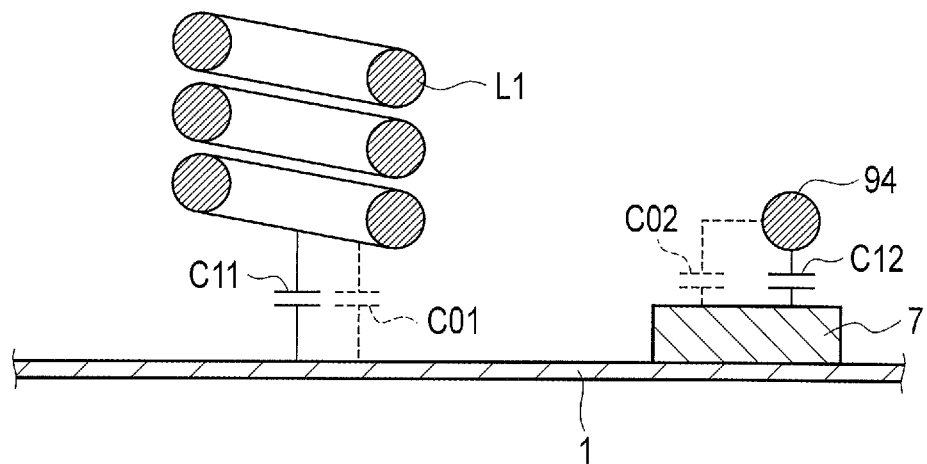
FIG. 12 is an explanatory diagram illustrating a cross-section of an inductance element and a second power feed bus of a power conversion device according to a seventh embodiment.

Next, a seventh embodiment of the present invention is described. FIG. 12 is an explanatory diagram illustrating a cross-section of the inductance element L1 and the second power feed bus 94 of a power conversion device according to the seventh embodiment. As illustrated in FIG. 12, in the seventh embodiment, the first capacitance element C11 is provided between the inductance element L1 and the housing 1, similarly to the fifth embodiment illustrated in FIG. 9. Further, the second capacitance element C12 is provided between the second power feed bus 94 and the housing 1. Further, the first stray capacitance C01 exists between the inductance element L1 and the housing 1, and the second stray capacitance C02 exists between the second power feed bus 94 and the housing 1. The seventh embodiment is different from the fifth embodiment in that the housing 1 near the second power feed bus 94 is formed by a thick portion 7.

In the power conversion device according to the seventh embodiment, an electrostatic capacitance that is a total of the first stray capacitance C01 and an electrostatic capacitance of the first capacitance element C11 can be made closer to an electrostatic capacitance that is a total of the second stray capacitance C02 and an electrostatic capacitance of the second capacitance element C12 by appropriately setting the electrostatic capacitances of the first capacitance element C11 and the second capacitance element C12. In this case, the second stray capacitance C02 can be adjusted by changing the thickness of the thick portion 7.

That is, it is possible to change the second stray capacitance C02 between the second power feed bus 94 and the housing 1 by changing the distance d, as expressed by the expression (1) described above. In the seventh embodiment, an electrostatic capacitance between the inductance element L1 and the housing 1 is matched with an electrostatic capacitance between the second power feed bus 94 and the housing 1 by adjusting the thickness of the thick portion 7 in addition to the first capacitance element C11 and the second capacitance element C12. Therefore, adjustment of electrostatic capacitances can be easily performed. Although FIG. 12 illustrates an example in which the thickness of the housing 1 is changed, the distance d can be changed by arranging a conductive plate member on an inner surface of the housing 1.

Accordingly, it is possible to make a voltage applied between the inductance element L1 and the housing 1 and a voltage applied between the second power feed bus 94 and the housing 1 closer to each other, so that noise propagating to the housing 1 can be reduced.

Descriptions of Modification of Seventh Embodiment

Figure 13:
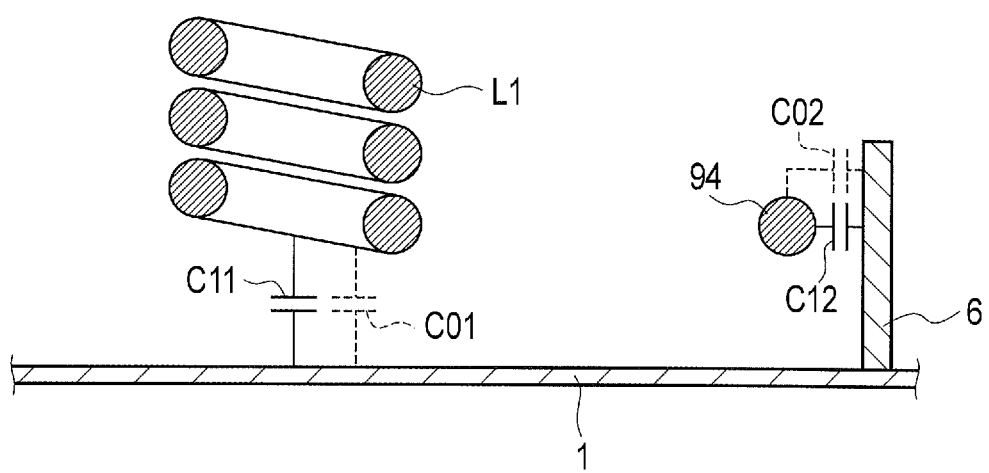
FIG. 13 is an explanatory diagram illustrating a cross-section of an inductance element and a second power feed bus of a power conversion device according to a modification of the seventh embodiment.

Next, a modification of the seventh embodiment of the present invention is described. FIG. 13 is an explanatory diagram illustrating a cross-section of the inductance element L1 and the second power feed bus 94 of a power conversion device according to the modification of the seventh embodiment. As illustrated in FIG. 13, a plate member 6 made of metal is provided on a portion of the inner surface of the housing 1, which is close to the second power feed bus 94, in the modification. Therefore, the second stray capacitance C02 can be adjusted by changing a distance between the second power feed bus 94 and the plate member 6, similarly to the seventh embodiment described above, so that it is possible to make an electrostatic capacitance that is a total of the inductance element L1 and the housing 1 and an electrostatic capacitance that is a total of the second power feed bus 94 and the housing 1 closer to each other with a simple operation.

Descriptions of Eighth Embodiment

Figure 14:
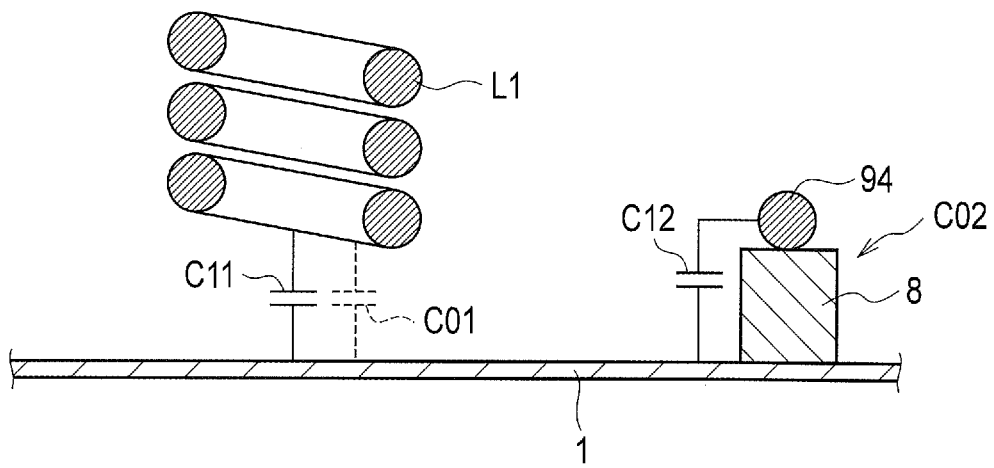
FIG. 14 is an explanatory diagram illustrating a cross-section of an inductance element and a second power feed bus of a power conversion device according to an eighth embodiment.

Next, an eighth embodiment of the present invention is described. FIG. 14 is an explanatory diagram illustrating a cross-section of the inductance element L1 and the second power feed bus 94 of a power conversion device according to the eighth embodiment. As illustrated in FIG. 14, in the eighth embodiment, the first capacitance element C11 is provided between the inductance element L1 and the housing 1, similarly to the fifth embodiment illustrated in FIG. 9. Further, the second capacitance element C12 is provided between the second power feed bus 94 and the housing 1.

The eighth embodiment is different from the fifth embodiment in that a second dielectric body 8 is provided between the second power feed bus 94 and the housing 1. The first stray capacitance C01 exists between the inductance element L1 and the housing 1, and the second stray capacitance C02 exists between the second power feed bus 94 and the housing 1. The second stray capacitance C02 is changed by a permittivity of the second dielectric body 8.

In the power conversion device according to the eighth embodiment, it is possible to make an electrostatic capacitance that is a total of the first stray capacitance C01 and an electrostatic capacitance of the first capacitance element C11 and an electrostatic capacitance that is a total of the second stray capacitance C02 and an electrostatic capacitance of the second capacitance element C12 closer to each other by appropriately setting the electrostatic capacitances of the first capacitance element C11 and the second capacitance element C12. The second stray capacitance C02 can be adjusted by changing a permittivity of the second dielectric body 8.

That is, it is possible to change the second stray capacitance C02 between the second power feed bus 94 and the housing 1 by changing the relative permittivity $\varepsilon r$, as expressed by the expression (1) described above. In the eighth embodiment, an electrostatic capacitance between the inductance element L1 and the housing 1 is matched with an electrostatic capacitance between the second power feed bus 94 and the housing 1 by adjusting the relative permittivity $\varepsilon r$ of the second dielectric body 8 in addition to the first capacitance element C11 and the second capacitance element C12. Therefore, adjustment of electrostatic capacitances can be easily performed.

Descriptions of Ninth Embodiment

Figure 15:
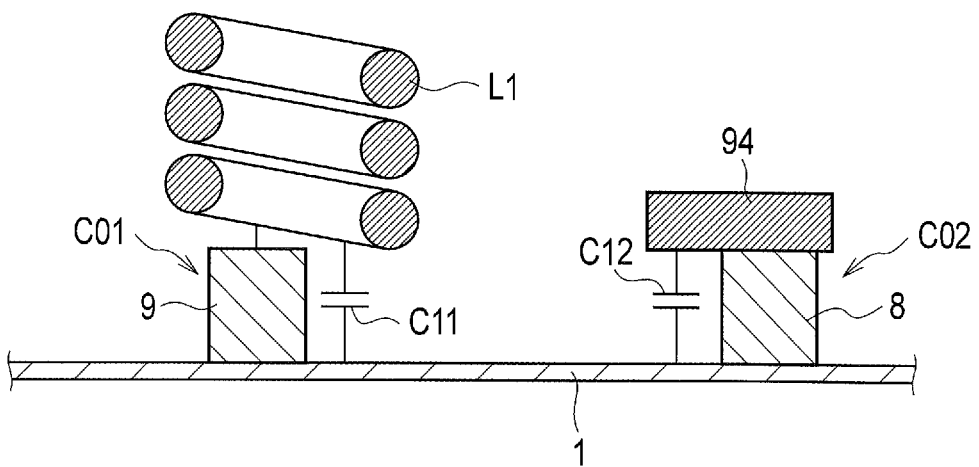
FIG. 15 is an explanatory diagram illustrating a cross-section of an inductance element and a second power feed bus of a power conversion device according to a ninth embodiment.

Next, a ninth embodiment of the present invention is described. FIG. 15 is an explanatory diagram illustrating a cross-section of the inductance element L1 and the second power feed bus 94 of a power conversion device according to the ninth embodiment. As illustrated in FIG. 15, in the ninth embodiment, the first capacitance element C11 is provided between the inductance element L1 and the housing 1, similarly to the fifth embodiment illustrated in FIG. 9. Further, the second capacitance element C12 is provided between the second power feed bus 94 and the housing 1.

The ninth embodiment is different from the fifth embodiment in that a first dielectric body 9 is provided between the inductance element L1 and the housing 1 and the second dielectric body 8 is provided between the second power feed bus 94 and the housing 1. The first stray capacitance C01 exists between the inductance element L1 and the housing 1, and the second stray capacitance C02 exists between the second power feed bus 94 and the housing 1. The first stray capacitance C01 is changed by a permittivity of the first dielectric body 9, and the second stray capacitance C02 is changed by a permittivity of the second dielectric body 8.

In the power conversion device according to the ninth embodiment, an electrostatic capacitance that is a total of the first stray capacitance C01 and an electrostatic capacitance of the first capacitance element C11 and an electrostatic capacitance that is a total of the second stray capacitance C02 and an electrostatic capacitance of the second capacitance element C12 are made closer to each other by appropriately setting the electrostatic capacitances of the first capacitance element C11 and the second capacitance element C12. In this case, the first stray capacitance C01 and the second stray capacitance C02 can be adjusted by changing permittivities of the first dielectric body 9 and the second dielectric body 8.

That is, it is possible to change the first stray capacitance C01 and the second stray capacitance C02 by changing the relative permittivity $\varepsilon r$ in the expression (1) described above. In the ninth embodiment, an electrostatic capacitance between the inductance element L1 and the housing 1 is matched with an electrostatic capacitance between the second power feed bus 94 and the housing 1 by adjusting the relative permittivity $\varepsilon r$ of the first dielectric body 9 and that of the second dielectric body 8 in addition to the first capacitance element C11 and the second capacitance element C12. Therefore, adjustment of electrostatic capacitances can be easily performed.

Descriptions of Tenth Embodiment

Figure 16:
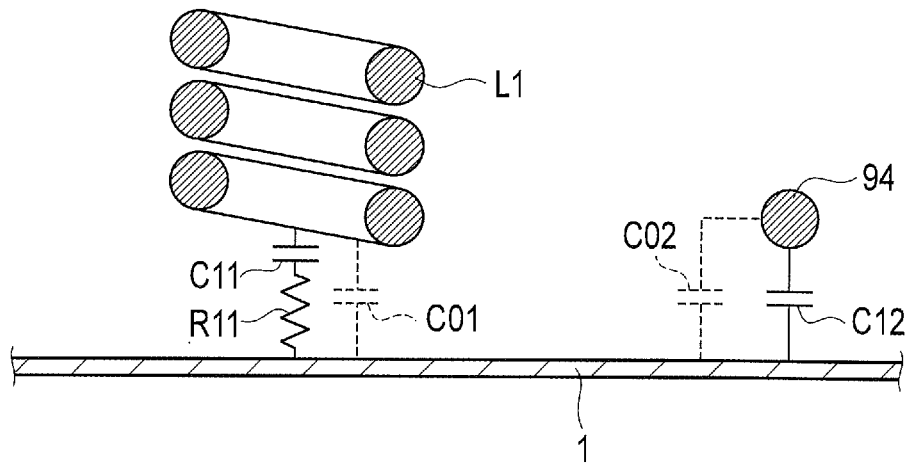
FIG. 16 is an explanatory diagram illustrating a cross-section of an inductance element and a second power feed bus of a power conversion device according to a tenth embodiment.

Next, a tenth embodiment of the present invention is described. FIG. 16 is an explanatory diagram illustrating a cross-section of the inductance element L1 and the second power feed bus 94 of a power conversion device according to the tenth embodiment. As illustrated in FIG. 16, in the tenth embodiment, a series-connected circuit formed by the first capacitance element C11 and a first resistance element R11 is provided between the inductance element L1 and the housing 1. Further, the second capacitance element C12 is provided between the second power feed bus 94 and the housing 1.

The first stray capacitance C01 exists between the inductance element L1 and the housing 1, and the second stray capacitance C02 exists between the second power feed bus 94 and the housing 1.

In the power conversion device according to the tenth embodiment, a combined impedance of the first stray capacitance C01 and the series-connected circuit formed by the first capacitance element C11 and the first resistance element R11 (hereinafter, this combined impedance is referred to as "first impedance") is made closer to a combined impedance of the second stray capacitance C02 and an electrostatic capacitance of the second capacitance element C12 (hereinafter, this combined impedance is referred to as "second impedance") by appropriately setting a resistance value of the first resistance element R11, an electrostatic capacitance of the first capacitance element C11, and the electrostatic capacitance of the second capacitance element C12.

Further, a resonance frequency (referred to as "first resonance frequency") exists between the inductance element L1 and the housing 1 because of existence of the first capacitance element C11, the first stray capacitance C01, and the inductance element L1. Therefore, in a case where the first resistance element R11 is not provided, a first impedance is reduced at a first resonance frequency, so that a difference between the first impedance and a second impedance is enlarged, causing generation of noise. In the present embodiment, reduction of the first impedance is prevented by providing the first resistance element R11. This point is described in detail below.

Figure 17:
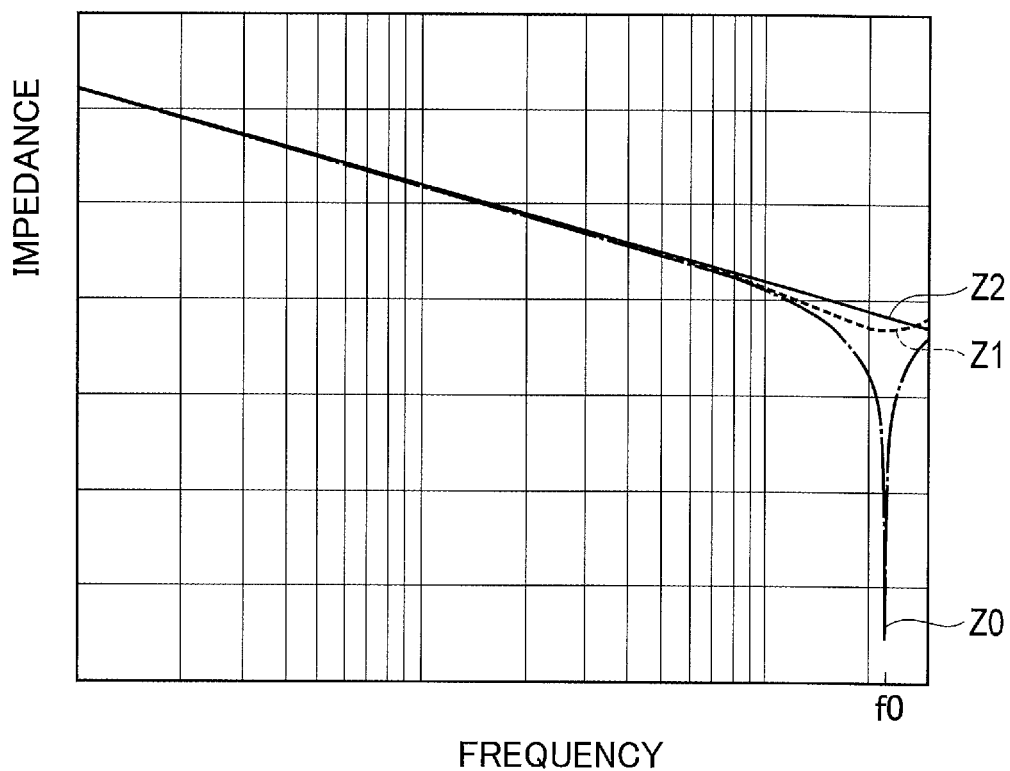
FIG. 17 is a graph representing a relation between a frequency and an impedance of the power conversion device according to the tenth embodiment.

FIG. 17 is a graph representing a relation between a frequency and an impedance. A curve Z2 (solid line) illustrated in FIG. 17 represents a change of a second impedance Z2 between the second power feed bus 94 and the housing 1.

A curve Z0 (alternate long and short dash line) represents a change of the first impedance in a case where the first resistance element R11 is not provided in FIG. 16, that is, the inductance element L1 and the housing 1 are connected to each other by the first capacitance element C11. As represented by the curve Z0, a first resonance frequency f0 exists between the inductance element L1 and the housing 1, at which the impedance is significantly reduced.

The first resonance frequency f0 described above can be expressed by the following expression (2).

[Equation 1]

$$f0 = \frac{1}{2\pi\sqrt{L1 \cdot C11}}. \quad (2)$$

In the present embodiment, reduction of the first impedance at the first resonance frequency f0 is suppressed by providing the first resistance element R11.

Specifically, the resistance value of the first resistance element R11 is set to a value that is larger than an impedance Z0(f0) at the frequency f0 and is smaller than the second impedance Z2(f0). That is, the resistance value of the first resistance element R11 is set in a range expressed by the following expression (3).

$$Z0(f0) \leq R11 \leq Z2(f0) \quad (3)$$

where Z0 is an impedance by the inductance element L1, the first capacitance element C11, and the first stray capacitance C01, and Z2 is an impedance by the second power feed bus 94, the second capacitance element C12, and the second stray capacitance C02. In the following descriptions, an element and a numerical value of that element are denoted by the same sign. For example, the resistance value of the resistance element R11 is denoted by the same sign R11.

As a result, the first impedance at the first resonance frequency f0 can be made higher than the lowest point of the impedance Z0. Further, by making the resistance value R11 closer to Z2(f0), a change of the first impedance with respect to a frequency becomes a change as illustrated by a curve Z1 (dotted line) in FIG. 17, so that the change of the first impedance can be made closer to the curve Z2.

That is, the resistance value of the first resistance element R11 is set to be equal to or lower than an impedance between the second power feed bus 94 and the housing 1 at the first resonance frequency f0 and be higher than an impedance between the inductance element L1 and the housing 1 in a case where the first resistance element R11 is not included. Preferably, the resistance value of the first resistance element R11 is set to match with the impedance between the second power feed bus 94 and the housing 1 at the first resonance frequency f0.

Therefore, at the first resonance frequency f0, it is possible to prevent rapid reduction of the first impedance, so that noise propagation to the housing 1 can be reduced without being influenced by a change of frequency.

Figure 18:
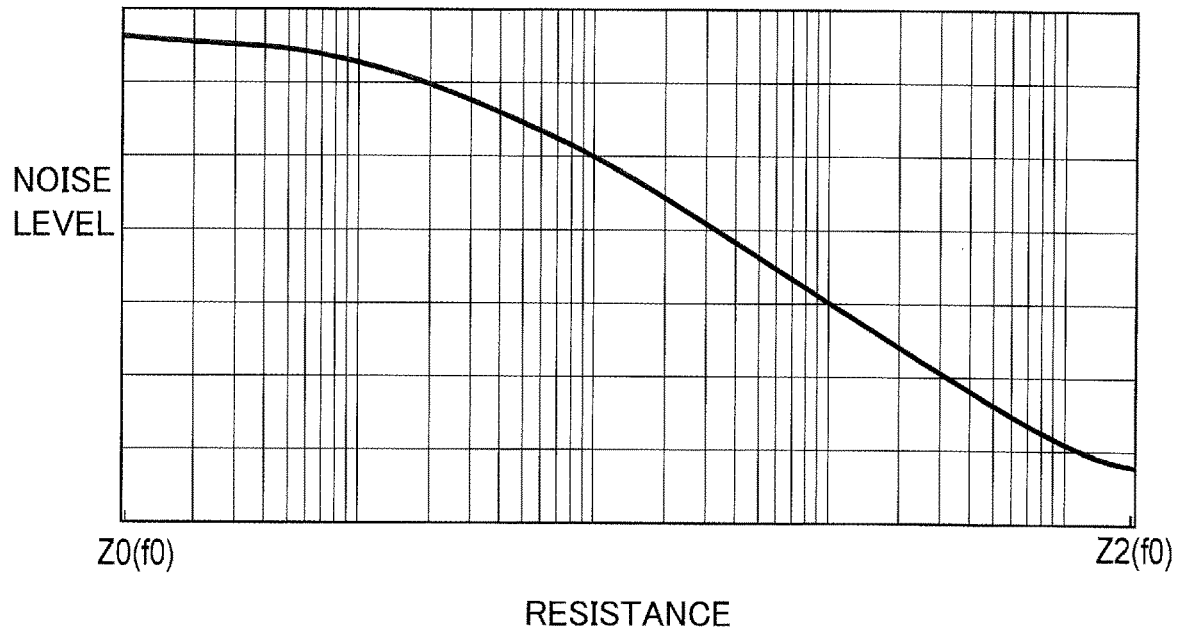
FIG. 18 is a graph representing a relation between an impedance and noise of the power conversion device according to the tenth embodiment.

FIG. 18 is a graph representing an effect of suppressing noise that propagates to the housing 1 at the first resonance frequency f0. The horizontal axis represents a magnitude of the first resistance element R11, and the vertical axis represents a noise level. As is understood from FIG. 18, by setting the resistance value R11 in a range from Z0(f0) to Z2(f0) (that is, a range expressed by the expression (3) described above), the noise level can be reduced, and the effect of suppressing noise can be increased as R11 becomes closer to Z2(f0).

In this manner, in the tenth embodiment, a series-connected circuit formed by the first capacitance element C11 and the first resistance element R11 is provided between the inductance element L1 and the housing 1. Therefore, even in a case where the first resonance frequency f0 exists between the inductance element L1 and the first capacitance element C11, it is possible to prevent reduction of the first impedance at the first resonance frequency by setting the resistance value of the first resistance element R11 in the range of the expression (3) described above. Consequently, it is possible to make a voltage applied between the inductance element L1 and the housing 1 and a voltage applied between the second power feed bus 94 and the housing 1 closer to each other, so that noise propagating to the housing 1 can be reduced.

In particular, noise can be reduced more effectively by matching the resistance value R11 with the impedance Z2(f0) between the second power feed bus 94 and the housing 1 at the first resonance frequency f0.

Descriptions of First Modification of Tenth Embodiment

Figure 19:
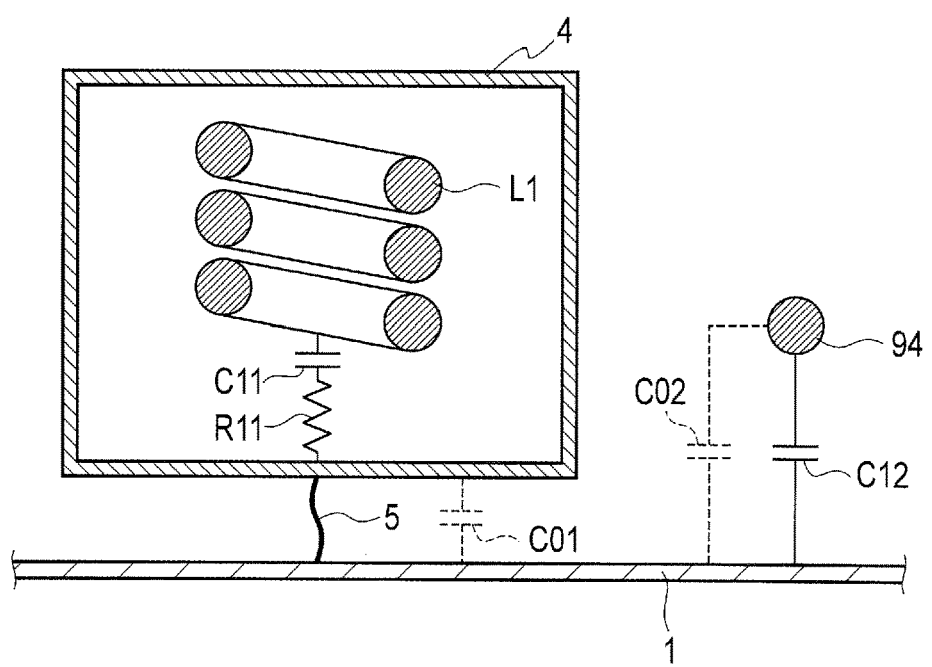
FIG. 19 is an explanatory diagram illustrating a cross-section of an inductance element and a second power feed bus of a power conversion device according to a first modification of the tenth embodiment.

Next, a first modification of the tenth embodiment is described. FIG. 19 is an explanatory diagram illustrating a cross-section of the inductance element L1 and the second power feed bus 94 of a power conversion device according to the first modification of the tenth embodiment.

As illustrated in FIG. 19, the inductance element L1 is housed in the frame 4 made of metal, such as iron or aluminum. The frame 4 is connected to the housing 1 by the wire 5. A series-connected circuit formed by the first resistance element R11 and the first capacitance element C11 is provided between the inductance element L1 and the frame 4.

According to this configuration, the inductance element L1 is housed in the frame 4, thereby suppressing noise directly radiated from the inductance element L1. Further, by providing the first resistance element R11 and the first capacitance element C11 within the frame 4, it is possible to make an impedance between the inductance element L1 and the frame 4 higher, so that an impedance between the inductance element L1 and the housing 1 can be made closer to an electrostatic capacitance between the second power feed bus 94 and the housing 1 (an electrostatic capacitance that is a total of the second capacitance element C12 and the second stray capacitance C02).

Further, by appropriately setting the resistance value of the first resistance element R11 similarly to the tenth embodiment described above, reduction of the first impedance at the first resonance frequency f0 can be prevented, and noise propagating from the inductance element L1 to the housing 1 can be suppressed.

Descriptions of Second Modification of Tenth Embodiment

Figure 20:
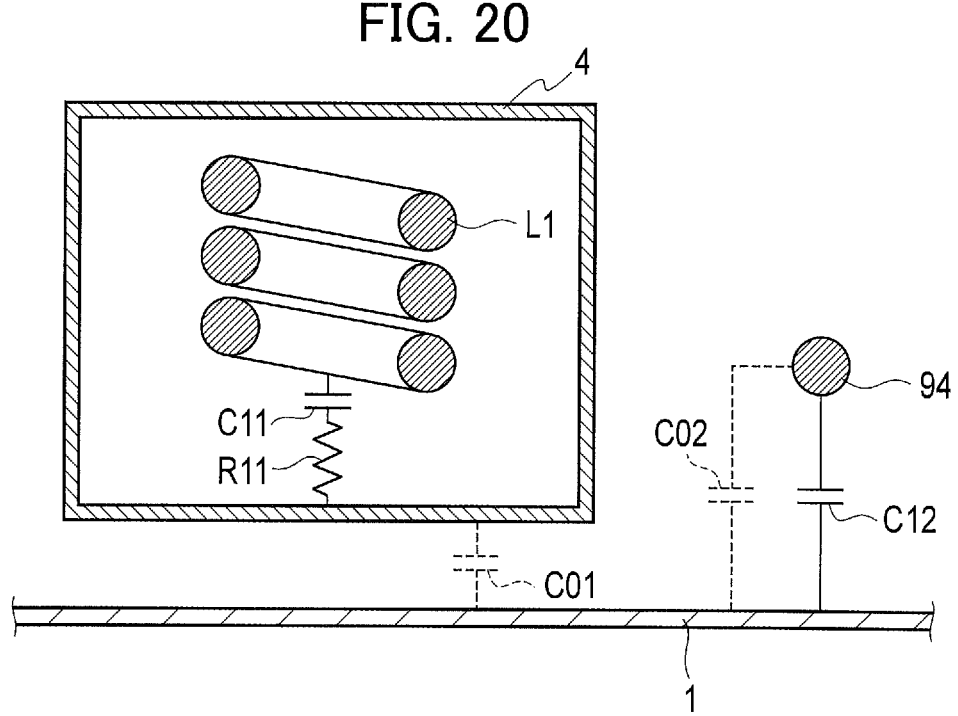
FIG. 20 is an explanatory diagram illustrating a cross-section of an inductance element and a second power feed bus of a power conversion device according to a second modification of the tenth embodiment.

Next, a second modification of the tenth embodiment is described. FIG. 20 is an explanatory diagram illustrating a cross-section of the inductance element L1 and the second power feed bus 94 of a power conversion device according to the second modification of the tenth embodiment.

As illustrated in FIG. 20, the inductance element L1 is housed in the frame 4 made of metal, such as iron or aluminum. A series-connected circuit formed by the first resistance element R11 and the first capacitance element C11 is provided between the inductance element L1 and the frame 4. Further, the frame 4 and the housing 1 are insulated from each other. The first stray capacitance C01 exists between the frame 4 and the housing 1.

Also in the second modification, the inductance element L1 is housed in the frame 4, similarly to the first modification described above. Therefore, noise directly radiated from the inductance element L1 can be suppressed. Further, by providing the first resistance element R11 and the first capacitance element C11 within the frame 4, an impedance between the inductance element L1 and the frame 4 can be increased. As a result, it is possible to make an impedance between the inductance element L1 and the housing 1 closer to an electrostatic capacitance between the second power feed bus 94 and the housing 1 (the electrostatic capacitance that is a total of the second capacitance element C12 and the second stray capacitance C02).

Further, by appropriately setting the resistance value of the first resistance element R11 similarly to the tenth embodiment described above, reduction of the first impedance at the first resonance frequency f0 can be prevented, and noise propagating from the inductance element L1 to the housing 1 can be suppressed.

Descriptions of Eleventh Embodiment

Figure 21:
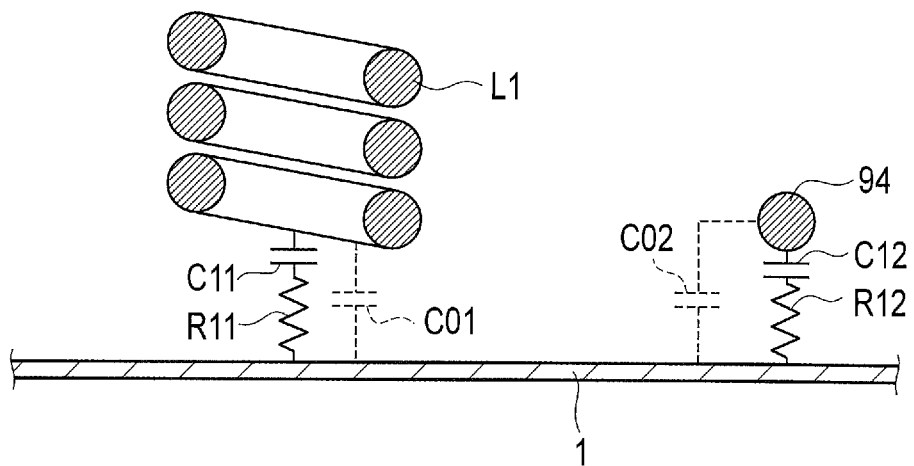
FIG. 21 is an explanatory diagram illustrating a cross-section of an inductance element and a second power feed bus of a power conversion device according to an eleventh embodiment.

Next, an eleventh embodiment of the present invention is described. FIG. 21 is an explanatory diagram illustrating a cross-section of the inductance element L1 and the second power feed bus 94 of a power conversion device according to the eleventh embodiment. As illustrated in FIG. 21, in the eleventh embodiment, a series-connected circuit formed by the first capacitance element C11 and the first resistance element R11 is provided between the inductance element L1 and the housing 1. Further, a series-connected circuit formed by a second resistance element R12 and the second capacitance element C12 is provided between the second power feed bus 94 and the housing 1.

In the power conversion device according to the eleventh embodiment, a first impedance between the inductance element L1 and the housing 1 and a second impedance between the second power feed bus 94 and the housing 1 are made closer to each other by appropriately setting a resistance value of the first resistance element R11, an electrostatic capacitance of the first capacitance element C11, a resistance value of the second resistance element R12, and an electrostatic capacitance of the second capacitance element C12.

Figure 22:
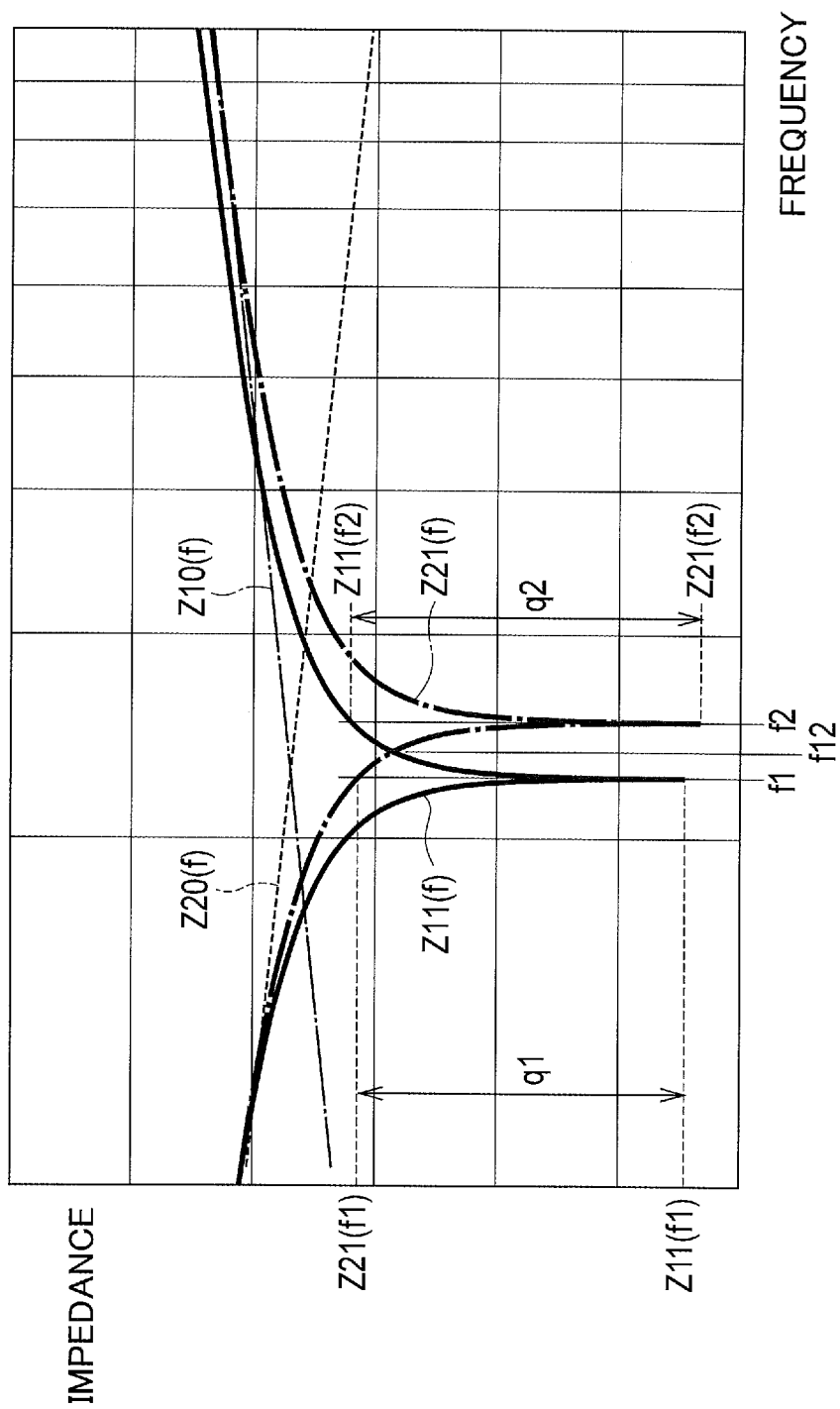
FIG. 22 is a graph representing a relation between a frequency and an impedance of the power conversion device according to the eleventh embodiment.

A method of setting the resistance values of the first resistance element R11 and the second resistance element R12 is described below. FIG. 22 is a graph representing a relation between a frequency and an impedance. A curve $Z11(f)$ illustrated in FIG. 22 represents an impedance between the inductance element L1 and the housing 1 in a case where the first resistance element R11 is not provided (first impedance), and a curve $Z21(f)$ represents an impedance between the second power feed bus 94 and the housing 1 in a case where the second resistance element R12 is not provided (second impedance).

Further, a curve $Z10(f)$ represents an impedance of the inductance element L1, and a curve $Z20(f)$ represents an impedance of the second power feed bus 94. Because the curve $Z10(f)$ only represents an inductance, the impedance increases with increase of a frequency. As for the curve $Z20(f)$, the impedance is reduced with increase of a frequency, because of existence of a stray capacitance.

Meanwhile, the impedance $Z11(f)$ and the impedance $Z21(f)$ have resonance frequencies, respectively. Although it is desirable that both resonance frequencies match with each other, the resonance frequencies are different in many cases. Here, it is assumed that the resonance frequency of the impedance $Z11(f)$ is a first resonance frequency f1 and the resonance frequency of the impedance $Z21(f)$ is a second resonance frequency 2.

Therefore, as illustrated in FIG. 22, $Z11(f)$ and $Z21(f)$ each have characteristics in which the impedance is rapidly reduced at the first resonance frequency f1 or the second resonance frequency 2. In the present embodiment, resistance values of the first resistance element R11 and the second resistance element R12 are set in such a manner that reduction of the first impedance and the second impedance is suppressed at the respective resonance frequencies f1 and f2.

A range of the resistance value R11 and a range of the resistance value R12 are set as expressed by the following expressions (4) and (5).

$$Z11(f1) \leq R11 \leq Z21(f1) \qquad (4).$$

$$Z21(f2) \leq R12 \leq Z11(f2) \qquad (5).$$

Specifically, the range of the resistance value R11 is set to a range denoted by a sign q1 in FIG. 22, and the range of the resistance value R12 is set to a range denoted by a sign q2.

By setting the resistance value of the first resistance element R11 to be in the range expressed by the expression (4) described above, it is possible to suppress reduction of the impedance of the curve $Z11(f)$ in FIG. 22 at the first resonance frequency f1. Similarly, by setting the resistance value of the second resistance element R12 to be in the range expressed by the expression (5) described above, it is possible to suppress reduction of the impedance of the curve $Z21(f)$ at the second resonance frequency f2.

That is, when a resonance frequency by the second power feed bus 94 and an electrostatic capacitance of the second capacitance element C12 is assumed as the second resonance frequency f2, the resistance value of the second resistance element R12 is set to be higher than the impedance $Z21(f2)$ between the second power feed bus 94 and the housing 1 and be lower than the impedance $Z11(f2)$ between the inductance element L1 and the housing 1, at the second resonance frequency f2 in a case where the second resistance element R12 is not included.

Therefore, by providing the resistance elements R11 and R12, it is possible to suppress reduction of the first impedance and the second impedance at the first resonance frequency f1 and the second resonance frequency f2, and to prevent generation of noise.

Figure 27:
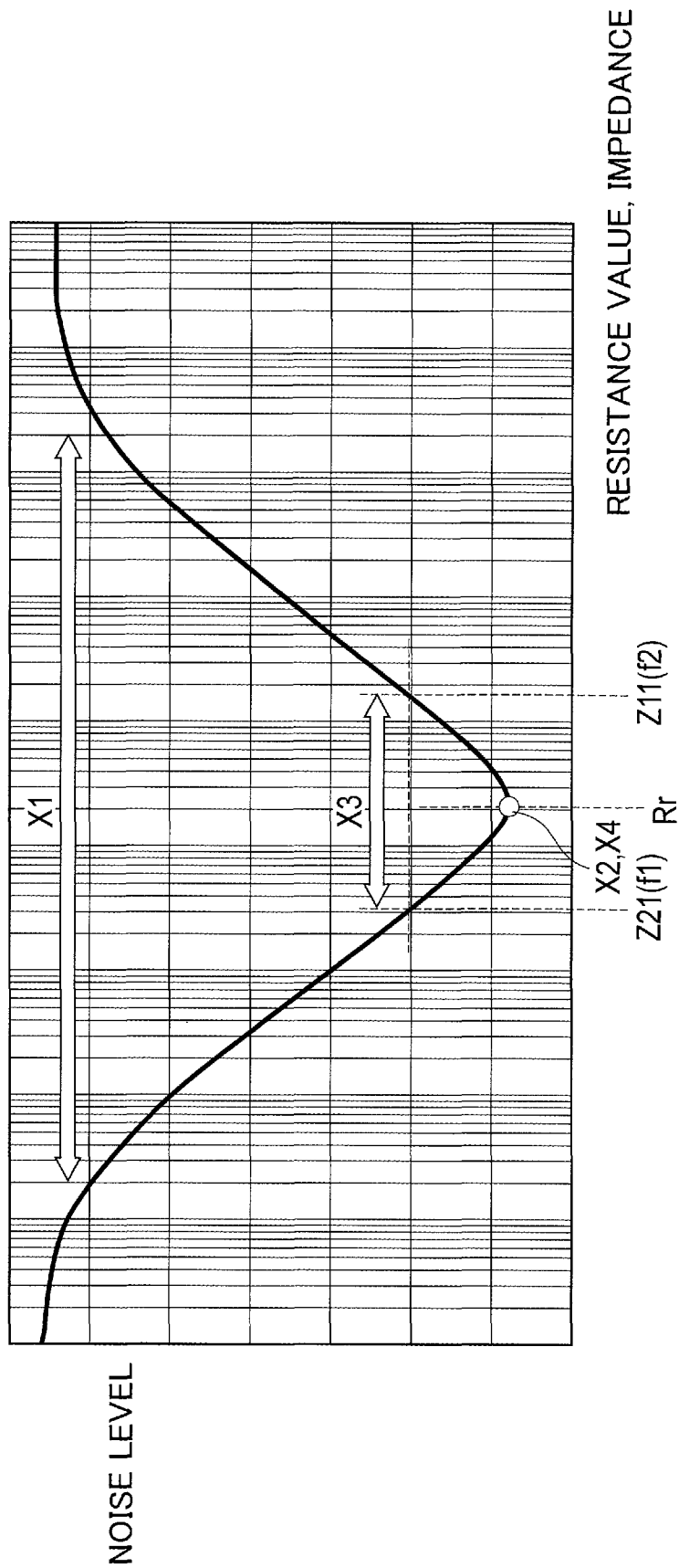
FIG. 27 is a graph representing a relation between a resistance value of each resistance element and a noise level in the power conversion device according to the eleventh embodiment.

FIG. 27 is a characteristic diagram illustrating a relation between a resistance value and a noise level, in which the horizontal axis represents a resistance value and the vertical axis represents a noise level. By setting the resistance values R11 and R12 as expressed by the expressions (4) and (5) described above, the resistance values are values in a range denoted by a sign X1. Therefore, the noise level can be reduced.

As described above, in the eleventh embodiment, a series-connected circuit formed by the first capacitance element C11 and the first resistance element R11 is provided between the inductance element L1 and the housing 1, and a series-connected circuit formed by the second capacitance element C12 and the second resistance element R12 is provided between the second power feed bus 94 and the housing 1. Therefore, it is possible to suppress reduction of the first impedance and the second impedance at the first resonance frequency f1 and the second resonance frequency f2, so that noise propagating to the housing 1 can be reduced.

Further, by setting the resistance values R11 and R12 as expressed by the expressions (4) and (5) described above, it is possible to suppress reduction of the impedance at the first resonance frequency f1 and the second resonance frequency f2, so that noise propagating to the housing 1 can be reduced.

Descriptions of First Modification of Eleventh Embodiment

Next, a first modification of the eleventh embodiment is described. In the first modification, each of the resistance values of the resistance elements R11 and R12 described above is set to a value expressed by the following expression (6).

$$R11, R11 \approx \{Z21(f1) + Z11(f2)\}/2 \quad (6).$$

Figure 23:
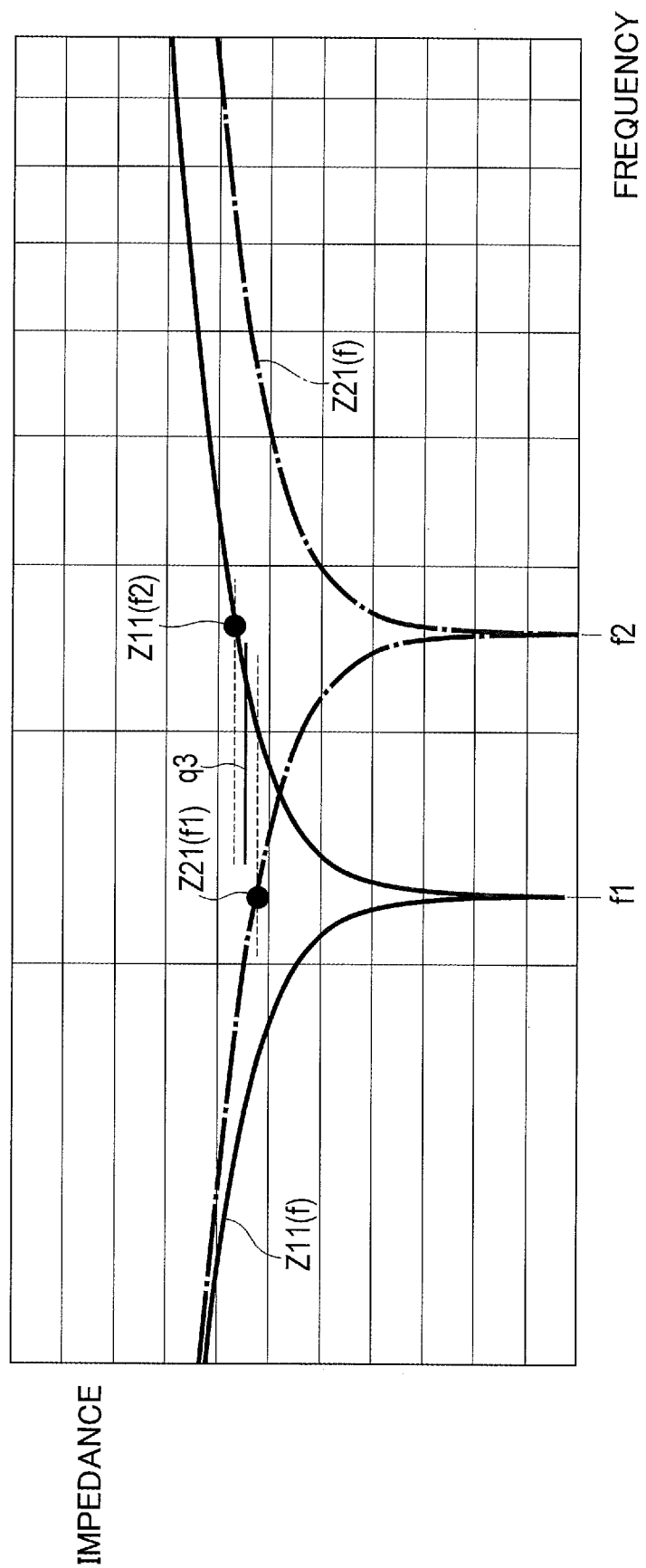
FIG. 23 is a graph representing a relation between a frequency and an impedance of a power conversion device according to a first modification of the eleventh embodiment.

This setting is described below with reference to a graph illustrated in FIG. 23. FIG. 23 is a graph representing the first impedance $Z11(f)$ and the second impedance $Z21(f)$, in which a difference between the first resonance frequency f1 and the second resonance frequency 12 illustrated in FIG. 22 is emphasized in order to facilitate understanding. Each of R11 and R12 obtained by the expression (6) described above is a resistance value denoted by a sign q3. That is, R11 and R12 are an average value between $Z21(f1)$ and $Z11(f2)$.

That is, each of the resistance values of the first resistance element R11 and the second resistance element R12 is set to an average value between the impedance $Z21(f1)$ between the second power feed bus 94 and the housing 1 at the first resonance frequency f1 and the impedance $Z11(f2)$ between the inductance element L1 and the housing 1 at the second resonance frequency f2.

Therefore, by setting the resistance values of the first resistance element R11 and the second resistance element R12 as expressed by the expression (6), it is possible to suppress reduction of the impedance of the curve $Z11(f)$ at the first resonance frequency f1. Similarly, it is possible to suppress reduction of the impedance of the curve $Z21(f)$ at the second resonance frequency f2.

By setting the resistance values R11 and R12 as expressed by the expression (6) described above, the resistance values can be a resistance value denoted by a sign X2 in FIG. 27, so that an effect of reducing the noise level can be maximized. Therefore, it is possible to suppress reduction of the first impedance and the second impedance at the first resonance frequency f1 and the second resonance frequency f2, so that noise propagating to the housing 1 can be reduced.

Descriptions of Second Modification of Eleventh Embodiment

Next, a second modification of the eleventh embodiment is described. In the second modification, resistance values of the first resistance element R11 and the second resistance element R12 are set in ranges expressed by the following expressions (7a) and (7b), respectively.

$$Z21(f1) \leq R11 \leq Z11(f2) \quad (7a).$$

$$Z21(f1) \leq R12 \leq Z11(f2) \quad (7b).$$

Figure 24:
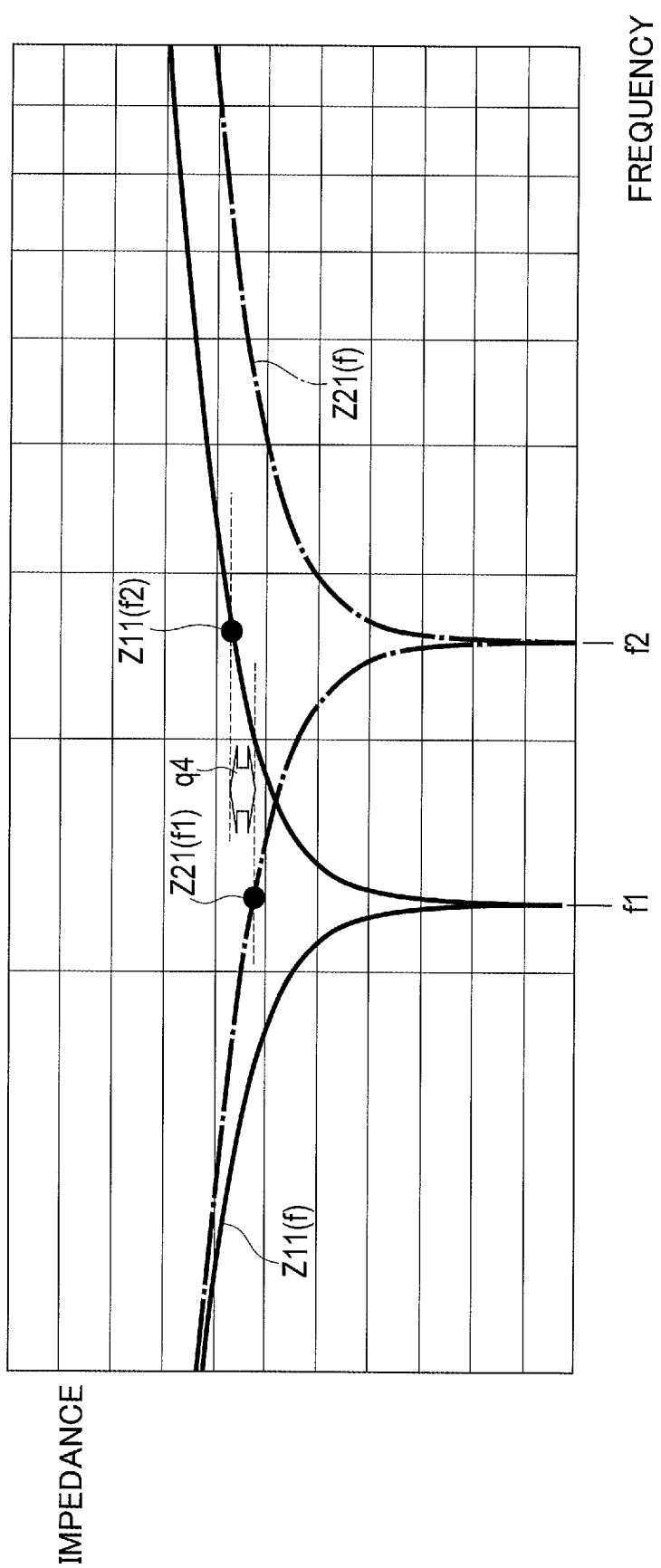
FIG. 24 is a graph representing a relation between a frequency and an impedance of a power conversion device according to a second modification of the eleventh embodiment.

This setting is described below with reference to a graph illustrated in FIG. 24. FIG. 24 is a graph representing the first impedance $Z11(f)$ and the second impedance $Z21(f)$, in which a difference between the first resonance frequency f1 and the second resonance frequency 12 illustrated in FIG. 22 is emphasized. R1 and R2 respectively set by the expressions (7a) and (7b) described above are in a range denoted by a sign q4 in FIG. 24.

That is, the resistance values of the first resistance element R11 and the second resistance element R12 are set to resistance values between the impedance $Z11(12)$ between the inductance element L1 and the housing 1 at the second resonance frequency 12 in a case where the first resistance element R11 is not included, and the impedance $Z21(f1)$ between the second power feed bus 94 and the housing 1 at the first resonance frequency f1 in a case where the second resistance element R12 is not included.

By setting the resistance values R11 and R12 as expressed by the expressions (7a) and (7b) described above, the respective resistance values R11 and R12 are in a range denoted by a sign X3 in FIG. 27, and a noise level can be reduced. As a result, it is possible to make a voltage generated between the inductance element L1 and the housing 1 and a voltage generated between the second power feed bus 94 and the housing 1 closer to each other, so that noise propagating to the housing 1 can be reduced.

Descriptions of Third Modification of Eleventh Embodiment

Figure 25:
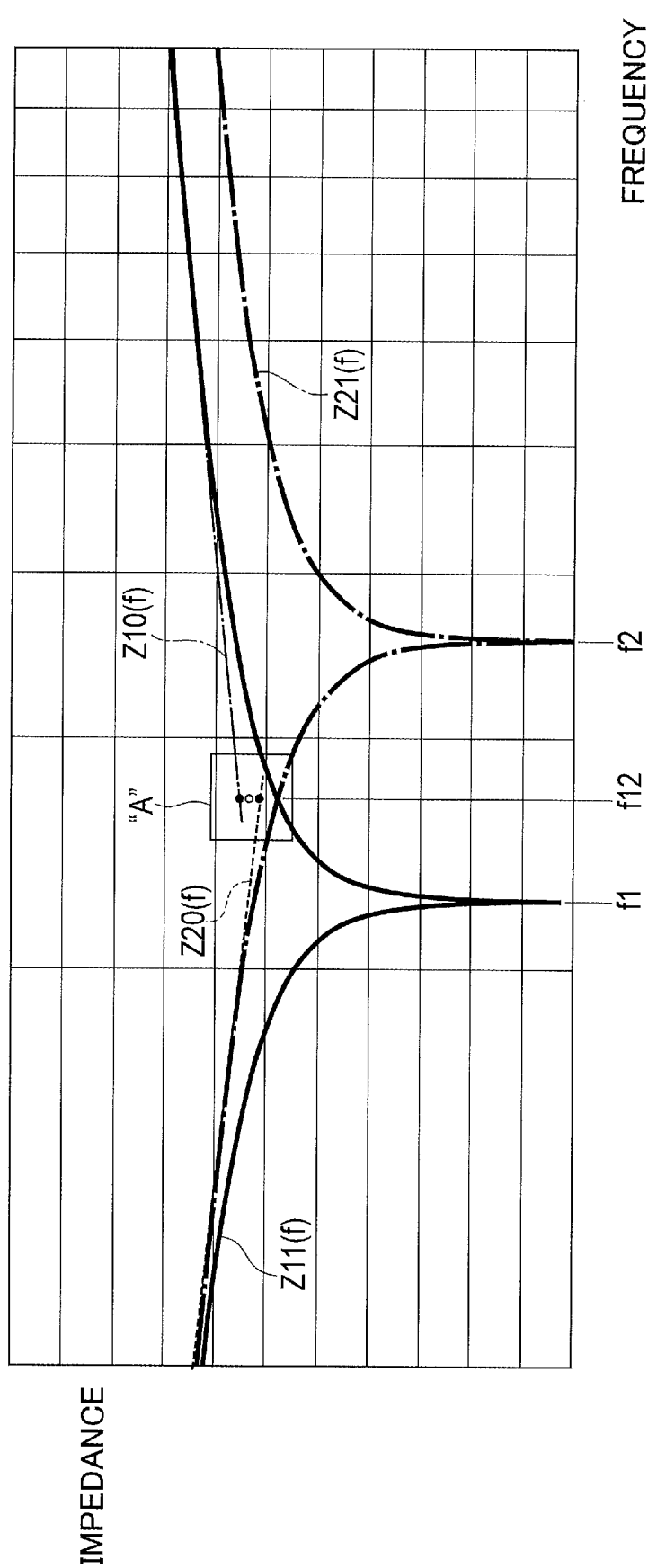
FIG. 25 is a graph representing a relation between a frequency and an impedance of a power conversion device according to a third modification of the eleventh embodiment.

Next, a third modification of the eleventh embodiment is described. In the third modification, each of the resistance values of the first resistance element R11 and the second resistance element R12 (assumed as "Rr") is set to a value expressed by the following expression (8).

$$Rr = R11, R12 = \{Z10(f12) + Z20(f12)\}/2 \quad (8)$$

where f12 is a frequency of an intersection of the curve Z11(f) and the curve Z21(f) as illustrated in FIG. 25. That is, the frequency f12 is an intermediate frequency between the first resonance frequency f1 and the second resonance frequency f2.

Figure 26:
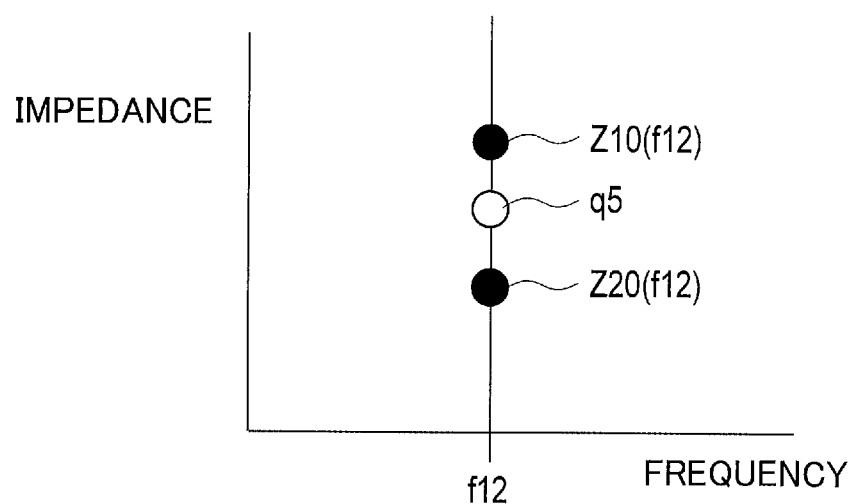
FIG. 26 is an enlarged view of a portion "A" illustrated in FIG. 25.

This setting is described below with reference to a graph illustrated in FIG. 25. FIG. 25 is a graph representing the first impedance Z11(f) and the second impedance Z21(f), in which a difference between the first resonance frequency f1 and the second resonance frequency f2 illustrated in FIG. 22 is emphasized. In addition, FIG. 26 is an enlarged view of a portion "A" in FIG. 25. Each of the resistance values R11 and R12 set by the expression (8) described above is a value denoted by a sign q5 in FIG. 26.

That is, the intermediate frequency f12 between the first resonance frequency f1 and the second resonance frequency f2 is set, and the resistance values of the first resistance element R11 and the second resistance element R12 are set to a resistance value between an impedance Z10(f2) between the inductance element L1 and the housing 1 in a case where the first impedance element is not provided, and an impedance Z20(f12) between the second power feed bus 94 and the housing 1 in a case where the second impedance element is not provided, at the intermediate frequency f12.

In this manner, each of the resistance values of the first resistance element R11 and the second resistance element R12 is set to an intermediate value between Z10(f12) and Z20(f12) at the frequency f12. Therefore, the resistance values R11 and R12 (=Rr) are a value X4 in FIG. 27, so that an effect of reducing the noise level can be maximized.

Accordingly, it is possible to make a voltage generated between the inductance element L1 and the housing 1 and a voltage generated between the second power feed bus 94 and the housing 1 closer to each other, so that noise propagating to the housing 1 can be reduced.

Other Embodiments

Figure 28:
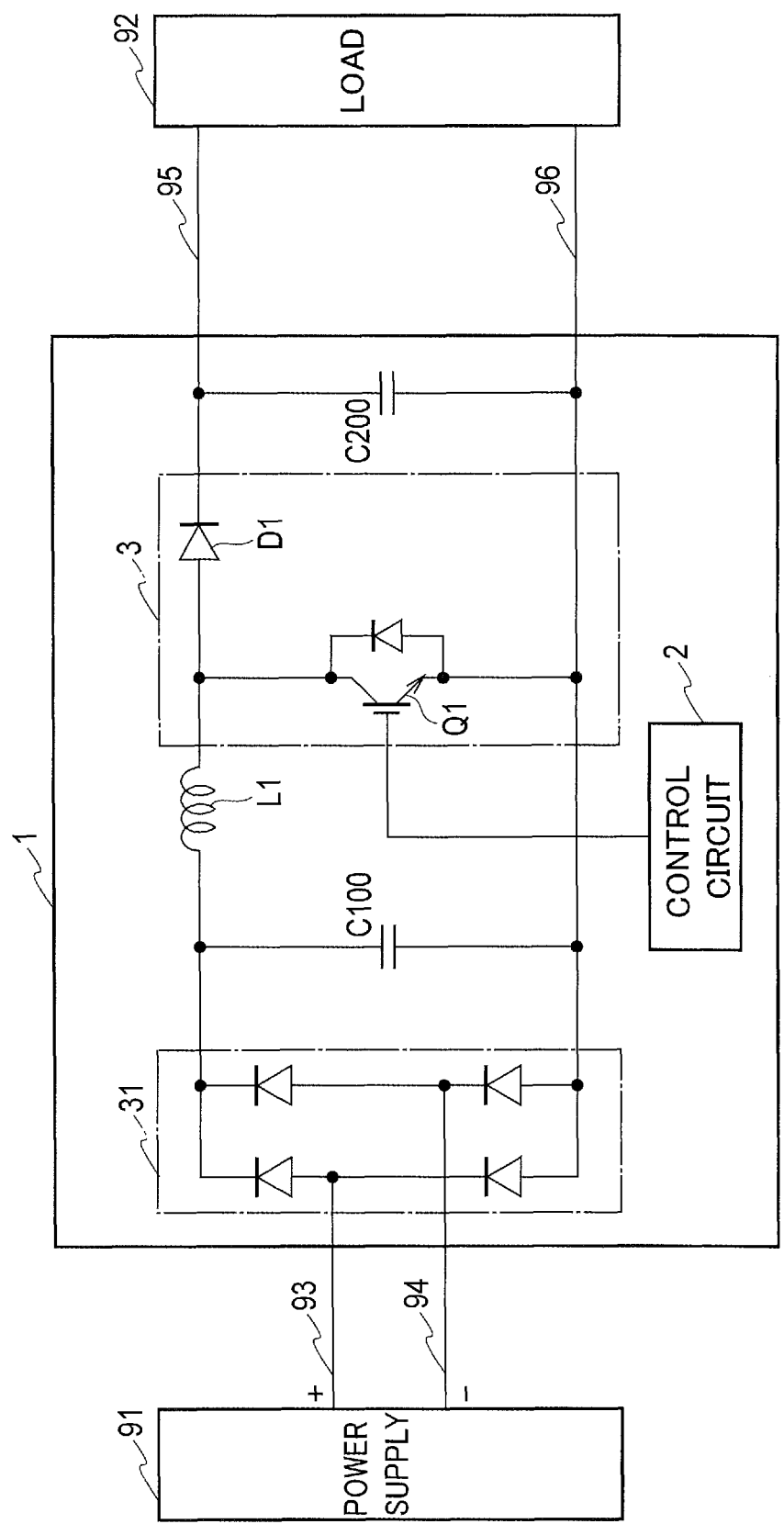
FIG. 28 is a circuit diagram illustrating another configuration of a power conversion device.

In each of the embodiments described above, an example has been described in which power is converted by using the power module 3 formed by the switching element Q1 and the diode D1 as illustrated in FIG. 1. However, the present invention is not limited to the embodiments. For example, a rectifier circuit 31 formed by a diode-bridge circuit can be provided at a preceding stage of the smoothing capacitor C100 as illustrated in FIG. 28. In a case where power supplied from the power supply 91 is alternating-current power, the alternating-current power can be rectified to be supplied to the power module 3.

Figure 29:
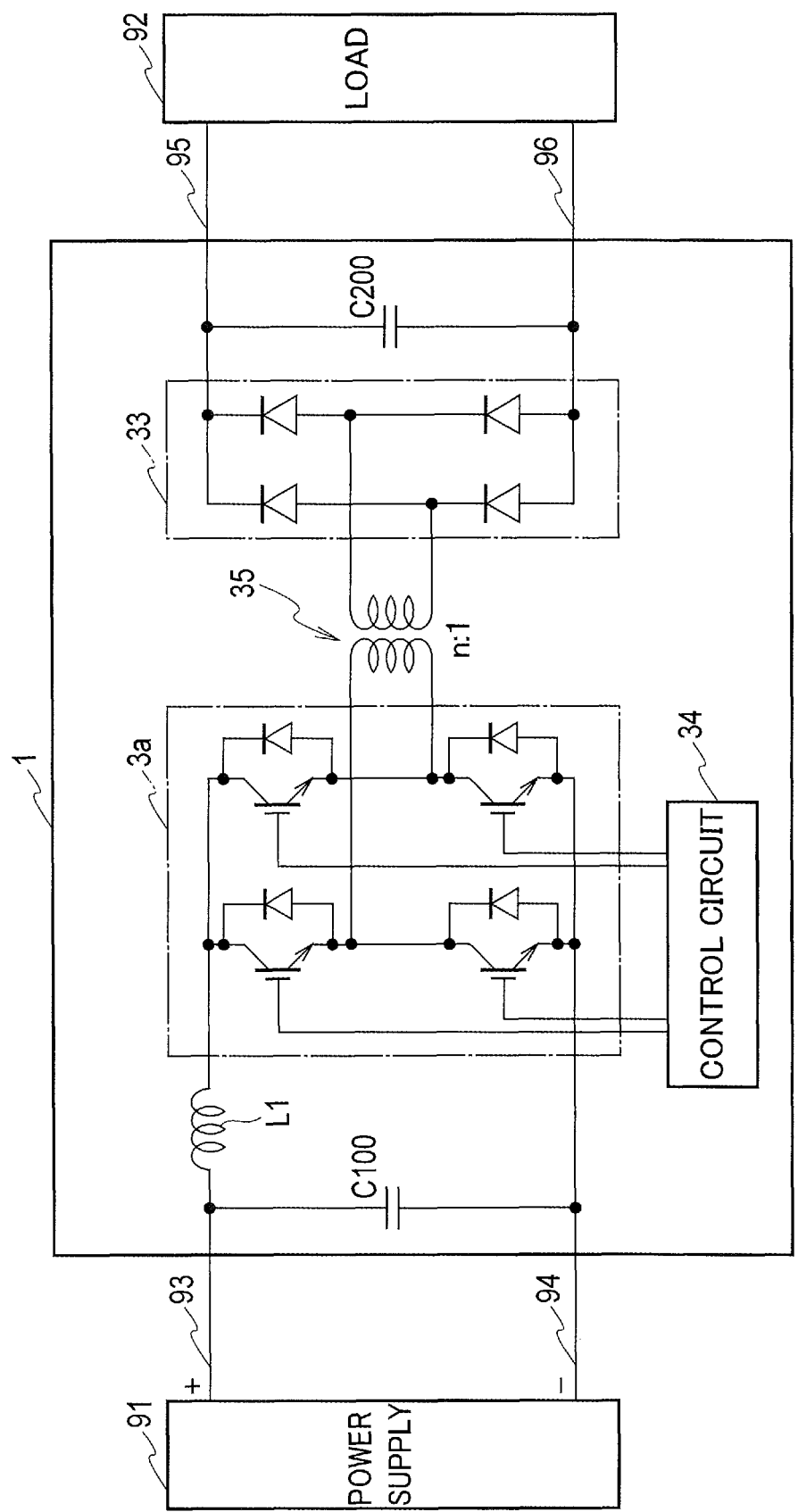
FIG. 29 is a circuit diagram illustrating further another configuration of a power conversion device.

Further, a power conversion device can be configured to include a power module 3a including four switching elements, a control circuit 34 that controls the power module 3a, a transformer 35, and a rectifier circuit 33 including four diodes at a subsequent stage of the inductance element L1 as illustrated in FIG. 29. Also with this configuration, noise can be reduced by providing the first impedance element between the inductance element L1 and the housing 1.

Although the power conversion device according to the present invention has been described above based on the embodiments as illustrated in the drawings, the present invention is not limited to those, and configurations of respective parts can be replaced by arbitrary configurations having identical functions thereto.

REFERENCE SIGNS LIST 1 housing
2, 34 control circuit
3, 3a power module
4 frame
5 wire
6 plate member
7 thick portion
8 second dielectric body
9 first dielectric body
11 first impedance element
12 second impedance element
31, 33 rectifier circuit
35 transformer
91 power supply
92 load
93 first power feed bus
94 second power feed bus
95, 96 output line
101 power conversion device
L1 inductance element
L1a planer inductance element
C01 first stray capacitance
C02 second stray capacitance
C11 first capacitance element
C12 second capacitance element
C100, C200 smoothing capacitor
D1 diode
f0 first resonance frequency
f1 first resonance frequency
f12 intermediate frequency
f2 second resonance frequency
L1 inductance element
L1a planer inductance element
Q1 switching element
R11 first resistance element
R12 second resistance element

The invention claimed is:

1. A power conversion device that converts power supplied from a first power feed bus and a second power feed bus, the power conversion device comprising:
    an inductance element connected to the first power feed bus;
    a switching element that converts power supplied between the first power feed bus and the second power feed bus by switching;
    a housing that houses the inductance element and the switching element therein;
    a first impedance element provided between the inductance element and the housing; and
    a second impedance element provided between the second power feed bus and the housing,
    wherein the first impedance element is electrically connected to the housing, and the second impedance element is electrically connected to the housing.

2. A power conversion device that converts power supplied from a first power feed bus and a second power feed bus, the power conversion device comprising:
    an inductance element connected to the first power feed bus;
    a switching element that converts power supplied between the first power feed bus and the second power feed bus by switching;
    a housing that houses the inductance element and the switching element therein; and
    a first impedance element provided between the inductance element and the housing, wherein
    the first impedance element is a first capacitance element that is provided between the inductance element and the housing in such a manner that an electrostatic capacitance between the inductance element and the housing, including a first stray capacitance between the inductance element and the housing, match with a second stray capacitance between the second power feed bus and the housing, and the first impedance element is electrically connected to the housing.

3. The power conversion device according to claim 1, wherein the first impedance element is a first capacitance element and the second impedance element is a second capacitance element, and electrostatic capacitances of the first capacitance element and the second capacitance element are set to match a total of a first stray capacitance between the inductance element and the housing and an electrostatic capacitance of the first capacitance element with a total of a second stray capacitance between the second power feed bus and the housing and an electrostatic capacitance of the second capacitance element.

4. The power conversion device according to claim 2, wherein the first impedance element is a first capacitance element provided between the inductance element and the housing, and an opposed area between the second power feed bus and the housing is set to match an electrostatic capacitance between the inductance element and the housing with a second stray capacitance between the second power feed bus and the housing.

5. The power conversion device according to claim 2, wherein the first impedance element is a first capacitance element provided between the inductance element and the housing, and a distance between the second power feed bus and the housing is set to match an electrostatic capacitance between the inductance element and the housing with a second stray capacitance between the second power feed bus and the housing.

6. The power conversion device according to claim 1, wherein the second impedance element is a second dielectric body provided between the second power feed bus and the housing, and a permittivity of the second dielectric body is set to match an electrostatic capacitance between the inductance element and the housing with an electrostatic capacitance between the second power feed bus and the housing.

7. The power conversion device according to claim 1, wherein the first impedance element is a first dielectric body and the second impedance element is a second dielectric body, and a permittivity of the first dielectric body and a permittivity of the second dielectric body are set to match an electrostatic capacitance between the inductance element and the housing with an electrostatic capacitance between the second power feed bus and the housing.

8. A power conversion device that converts power supplied from a first power feed bus and a second power feed bus, the power conversion device comprising:

an inductance element connected to the first power feed bus;

a switching element that converts power supplied between the first power feed bus and the second power feed bus by switching;

a housing that houses the inductance element and the switching element therein; and a first impedance element provided between the inductance element and the housing, wherein the first impedance element is formed by a first capacitance element and a first resistance element, and the first impedance element is electrically connected to the housing.

9. The power conversion device according to claim 8, wherein a resonance frequency by the inductance element and the first impedance element is a first resonance frequency, a resistance value of the first resistance element is equal to or less than an impedance between the second power feed bus and the housing at the first resonance frequency and is larger than an impedance between the inductance element and the housing in a case where the first resistance element is not included.

10. The power conversion device according to claim 8, wherein a resonance frequency by the inductance element and the first impedance element is a first resonance frequency, a resistance value of the first resistance element matches with an impedance between the second power feed bus and the housing at the first resonance frequency.

11. The power conversion device according to claim 1, wherein the second impedance element is formed by a second capacitance element and a second resistance element.

12. The power conversion device according to claim 11, wherein a resonance frequency by the second power feed bus and an electrostatic capacitance of the second capacitance element is a second resonance frequency, a resistance value of the second resistance element is larger than an impedance between the second power feed bus and the housing in a case where the second resistance element is not included, and is smaller than an impedance between the inductance element and the housing, at the second resonance frequency.

13. The power conversion device according to claim 1, wherein the first impedance element is formed by a first capacitance element and a first resistance element, and the second impedance element is formed by a second capacitance element and a second resistance element, and a resonance frequency by the inductance element and the first impedance element is a first resonance frequency and a resonance frequency by the second power feed bus and the second impedance element is a second resonance frequency, each of resistance values of the first resistance element and the second resistance element is an average value between an impedance between the second power feed bus and the housing at the first resonance frequency and an impedance between the inductance element and the housing at the second resonance frequency.

14. The power conversion device according to claim 1, wherein the first impedance element includes a first capacitance element and a first resistance element, and the second impedance element includes a second capacitance element and a second resistance element, and a resonance frequency by the inductance element and the first impedance element is a first resonance frequency and a resonance frequency by the second power feed bus and the second impedance element is a second resonance frequency, each of resistance values of the first resistance element and the second resistance element is a resistance value between an impedance between the inductance element and the housing at the second resonance frequency in a case where the first resistance element is not included, and an impedance between the second power feed bus and the housing at the first resonance frequency in a case where the second resistance element is not included.

15. The power conversion device according to claim 1, wherein the first impedance element includes a first capacitance element and a first resistance element, and the second impedance element includes a second capacitance element and a second resistance element, and a resonance frequency by the inductance element and the first impedance element is a first resonance frequency, and a resonance frequency by the second power feed bus and the second impedance element is a second resonance frequency, and an intermediate frequency between the first resonance frequency and the second resonance frequency is further set, each of resistance values of the first resistance element and the second resistance element is a resistance value between an impedance between the inductance element and the housing in a case where the first impedance element is not provided, and an impedance between the second power feed bus and the housing in a case where the second impedance element is not provided, at the intermediate resonance frequency.

* * * * *